US012477245B2

United States Patent
Hurwitz et al.

(10) Patent No.: US 12,477,245 B2
(45) Date of Patent: Nov. 18, 2025

(54) IMAGE SENSOR

(71) Applicant: Analog Devices International Unlimited Company, Limerick (IE)

(72) Inventors: Jonathan Ephraim David Hurwitz, Edinburgh (GB); Edward Chapin Guthrie, Charlestown, MA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 18/628,425

(22) Filed: Apr. 5, 2024

(65) Prior Publication Data

US 2024/0365020 A1 Oct. 31, 2024

Related U.S. Application Data

(60) Provisional application No. 63/461,752, filed on Apr. 25, 2023.

(51) Int. Cl.
*H04N 25/703* (2023.01)
*H04N 17/00* (2006.01)
*H04N 25/78* (2023.01)

(52) U.S. Cl.
CPC ......... *H04N 25/703* (2023.01); *H04N 17/002* (2013.01); *H04N 25/78* (2023.01)

(58) Field of Classification Search
CPC ..... H04N 25/78; H04N 25/703; H04N 17/002
See application file for complete search history.

(56) References Cited

U.S. PATENT DOCUMENTS

| | | | | |
|---|---|---|---|---|
| 7,526,362 B2* | 4/2009 | Kim | ..................... | G05D 1/0033 701/28 |
| 8,830,067 B2* | 9/2014 | Igaki | ....................... | G06F 3/017 340/693.11 |
| 11,671,555 B2* | 6/2023 | Kawazu | ................. | H04N 25/76 348/148 |
| 2009/0066793 A1 | 3/2009 | Takeda | | |

(Continued)

FOREIGN PATENT DOCUMENTS

WO 2020121699 6/2020

OTHER PUBLICATIONS

"European Application Serial No. 24170625.8, Extended European Search Report mailed Aug. 26, 2024", 10 pgs.

(Continued)

*Primary Examiner* — Michael B. Pierorazio
(74) *Attorney, Agent, or Firm* — Schwegman Lundberg & Woessner, P.A.

(57) ABSTRACT

The present disclosure relates to imaging systems having functionality for detecting faults in the control and/or readout of the image sensor. In one example, there is a system comprising an image sensor having a plurality of imaging pixels and at least one diagnostic pixel coupled to a reference signal. The system also comprises control and readout circuitry configured to select one or more of the imaging pixels and, for each selected imaging pixel, readout an imaging signal that is indicative of the charge accumulated on the selected imaging pixel, select the at least one diagnostic pixel and, for each selected diagnostic pixel, readout a diagnostic signal that is indicative of the reference signal of the selected diagnostic pixel, and output the diagnostic signal for use in system diagnostics.

20 Claims, 14 Drawing Sheets

(56) References Cited

U.S. PATENT DOCUMENTS

| | | | |
|---|---|---|---|
| 2010/0192173 A1* | 7/2010 | Mizuki | H04N 21/4312 |
| | | | 725/115 |
| 2019/0037211 A1 | 1/2019 | Oguro et al. | |
| 2020/0014914 A1 | 1/2020 | Chua et al. | |
| 2021/0358992 A1* | 11/2021 | Magnani | H10F 39/18 |
| 2021/0360187 A1* | 11/2021 | Sakakibara | H04N 25/78 |
| 2022/0053156 A1* | 2/2022 | Kawasaki | H04N 25/618 |
| 2022/0124269 A1* | 4/2022 | Dedek | H04N 25/745 |
| 2022/0132064 A1* | 4/2022 | Suzuki | H04N 25/78 |
| 2022/0247946 A1 | 8/2022 | Chossat et al. | |

OTHER PUBLICATIONS

"Japanese Application Serial No. 2024-071503, Notification of Reasons for Rejection mailed Jan. 7, 2025", w/ English machine translation, 9 pgs.

\* cited by examiner

IMAGE SENSOR

CLAIM OF PRIORITY

This application claims priority to U.S. Provisional Application Ser. No. 63/461,752, filed on Apr. 25, 2023, entitled "IMAGE SENSOR" which is hereby incorporated by reference herein in its entirety.

TECHNICAL FIELD

The present disclosure relates to an image sensor system comprising an image sensor having one or more diagnostic pixels and control and readout circuitry arranged to readout a diagnostic signal(s) from the diagnostic pixel(s).

BACKGROUND

Image sensors typically comprise a plurality of imaging pixels arranged in a matrix of rows and columns. Each pixel accumulates charge in dependence on the light that is incident on the pixel. Typically, that charge is output from the image sensor using readout lines and then digitally converted using analog to digital converters (ADCs). For example, control circuitry may select pixels to be readout using control lines that span the image sensor in one dimension (for example, there may be one or more control lines running along each row, so that the pixels may be selected on a per-row basis). The charge on the selected pixels may then be output using readout lines that span the image sensor in a second dimension (for example, there may be at least one readout line running along each column, so that the pixels of the select row may be output in parallel using the readout lines). Those output values may then be digitally converted by one or more ADCs.

Image sensors are used for a variety of different purposes, for many of which accuracy and reliability of the image sensor is important for safety reasons. For example, autonomous or semi-autonomous vehicles may use a time of flight (ToF) or LIDAR system in order to understand the environment around the vehicle and make decisions about how the vehicle may safety proceed. ToF and LIDAR systems usually have an image sensor that is used to generate a depth map/frame of the scene, using which the vehicle may understand the 3D position of objects around the vehicle. If the image sensor is not functioning correctly, the depth map/frame may include errors or inaccuracies that may result in the vehicle taking dangerous actions. In a further example, 2D image sensors (i.e., not ToF or LIDAR image sensors) may be used for purposes where safety is important, such as for object recognition in safety critical systems, where errors in the operation of the image sensor may cause unsafe actions to take place.

There are many different types of faults that could occur with image sensors and their peripheral control and readout circuitry. For example, the rows may be selected and readout in the wrong order, which may result in an image inaccurately representing the imaged scene since some rows of the image may appear to be imaging one part of the scene, when in fact they are imaging another part of the scene. Another error may be that columns may be read in the wrong order, which may result in an image inaccurately representing the imaged scene since some columns of the image may appear to be imaging one part of the scene, when in fact they are imaging another part of the scene. Another error may be a fault in the row selection control lines and/or in the charge readout lines, such as a break in the line, which may result in the image including pixels that have not been properly selected and/or readout such that the content of those pixels is not trustworthy. Another error may be a fault in one or more ADCs resulting in inaccurate and therefore untrustworthy pixels in the image. When imaging sensors are used in safety critical systems it may be important to detect when faults such as these are taking place, so that the systems using the outputs of the imaging sensor may take appropriate action, such as ceasing to use the imaging sensor, or turning off the safety critical system, or flagging that a fault has occurred so that it may be investigated and fixed.

DRAWINGS

Aspects of the present disclosure are described, by way of example only, with reference to the following drawings, in which.

DETAILED DESCRIPTION

When image sensors are used as part of safety critical systems, it can be desirable that the image readout order is specified so that it can be detected if the row and/or column readout order is not correct (for example, if the image is flipped, rows are swapped, rows are skipped, rows are repeated, columns are swapped, columns are skipped, columns are repeated, etc). For image sensors that are not themselves proven functionally safe, the readout order may need to be provable by another device in the system in order to create a safety system. This means that the diagnostic information used for verifying readout order should be embedded within the image data that is readout from the image sensor.

Some systems may seek to digitally replace the values within some of the image sensor pixels with predetermined diagnostic values so that it can be detected if those diagnostic values are being readout accurately from the same location at which they were set. However, solutions such as those assume that the circuitry and control signals applying the diagnostic values to the image sensor are operating correctly and accurately, which is not always the case.

Therefore, the inventors have developed techniques whereby diagnostic data can be readout from the image sensor in a way that does not rely on additional diagnostic circuitry (such as circuitry configured to apply diagnostic values to particular pixels of the image sensor) and that enables the detection of faults in the image sensor control and/or readout circuitry.

Figure 1:
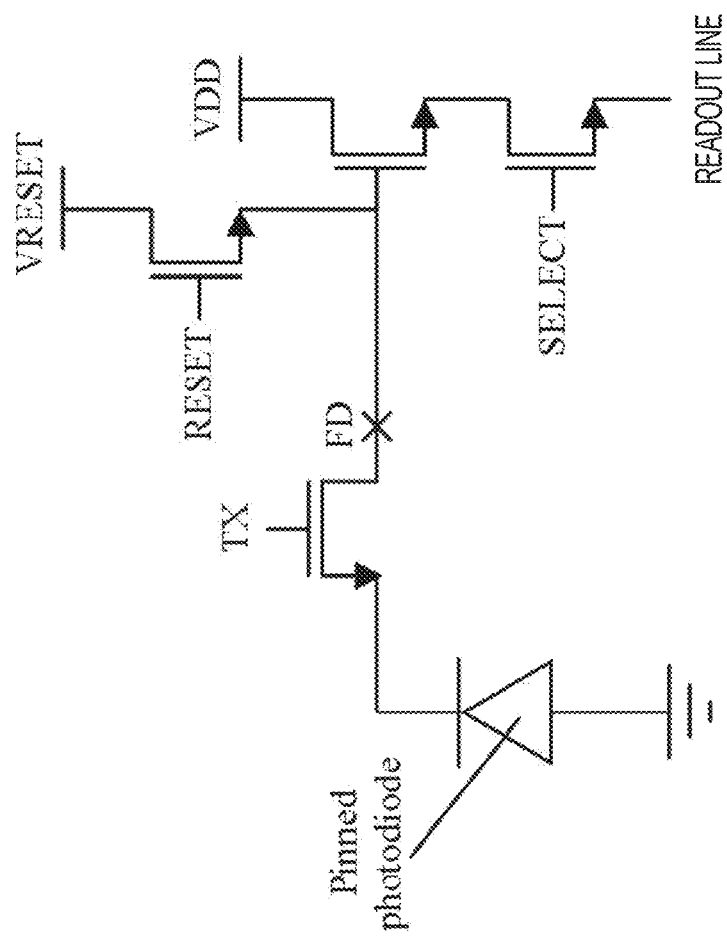
FIG. 1 shows an example imaging pixel structure.

FIG. 1 shows an example of a typical imaging pixel structure. The pixel includes a photodiode (in this example a pinned photodiode, although any suitable type of photodiode may be used) where charge is accumulated in dependence on light incident to the pixel. Charge may be readout from the pixel to the readout line using the control signals RESET, SELECT and TX. Readout may be executed by carrying out the following process:
1. Enable the SELECT signal to turn on the SELECT FET;
2. Pulse (eg turn on and then off) the RESET signal so that a reset voltage is put on the floating diffusion (FD) of the pixel and output to the readout line;
3. Sample the output reset voltage, for example by digitally converting the reset voltage using an ADC coupled to the readout line and storing the digital value;
4. Pulse (eg turn on and then off) the TX signal so that the photodiode voltage is put on the floating diffusion (FD) of the pixel and output to the readout line;
5. Sample the output photodiode voltage, for example by digitally converting the photodiode voltage using an ADC coupled to the readout line and storing the digital value;
6. Determine the final pixel value using the sampled reset voltage and sampled photodiode voltage, for example by performing correlated double sampling (CDS).

Various other pixel structures and control processed are possible, such as differential pixels that include two photodiodes, or quad pixels that include four photodiodes, and the above structure and process is merely one non-limiting example.

Figure 2:
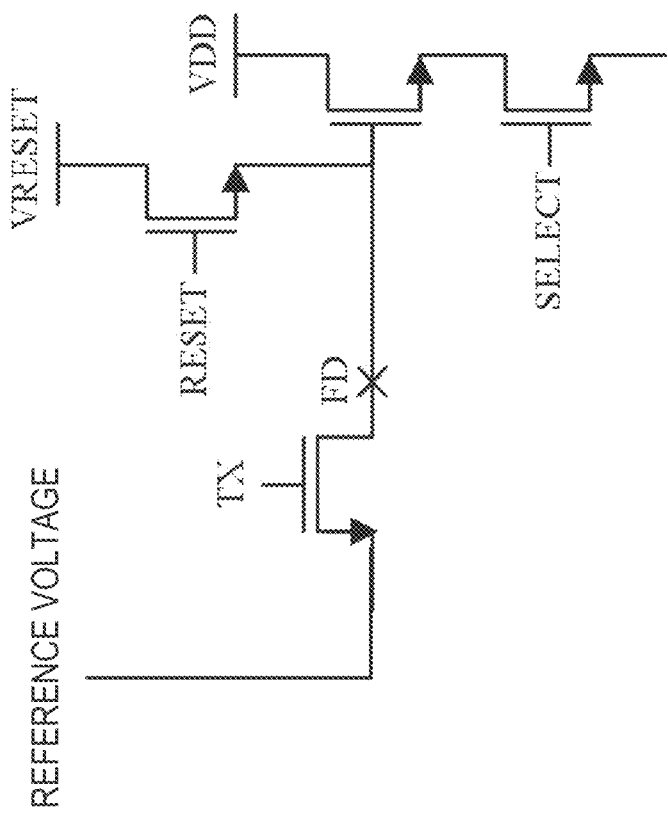
FIG. 2 shows an example diagnostic pixel structure.

FIG. 2 shows an example of a diagnostic pixel in accordance with an aspect of the current disclosure. It can be seen that the structure is exactly the same as that of FIG. 1 except that it does not include a photodiode and instead includes a coupling to a predetermined reference voltage. Readout may be executed in the same way as described above. Consequently, the same structures and processes are used for the diagnostic pixel as for the photodiode pixel, except that the final pixel value arrived at the end of the readout process should correspond to the predetermined reference voltage (within error margins in consideration of factors such as signal noise and reset voltage variability) if all of the control and readout circuitry is operating correctly and reliably.

Figure 3:
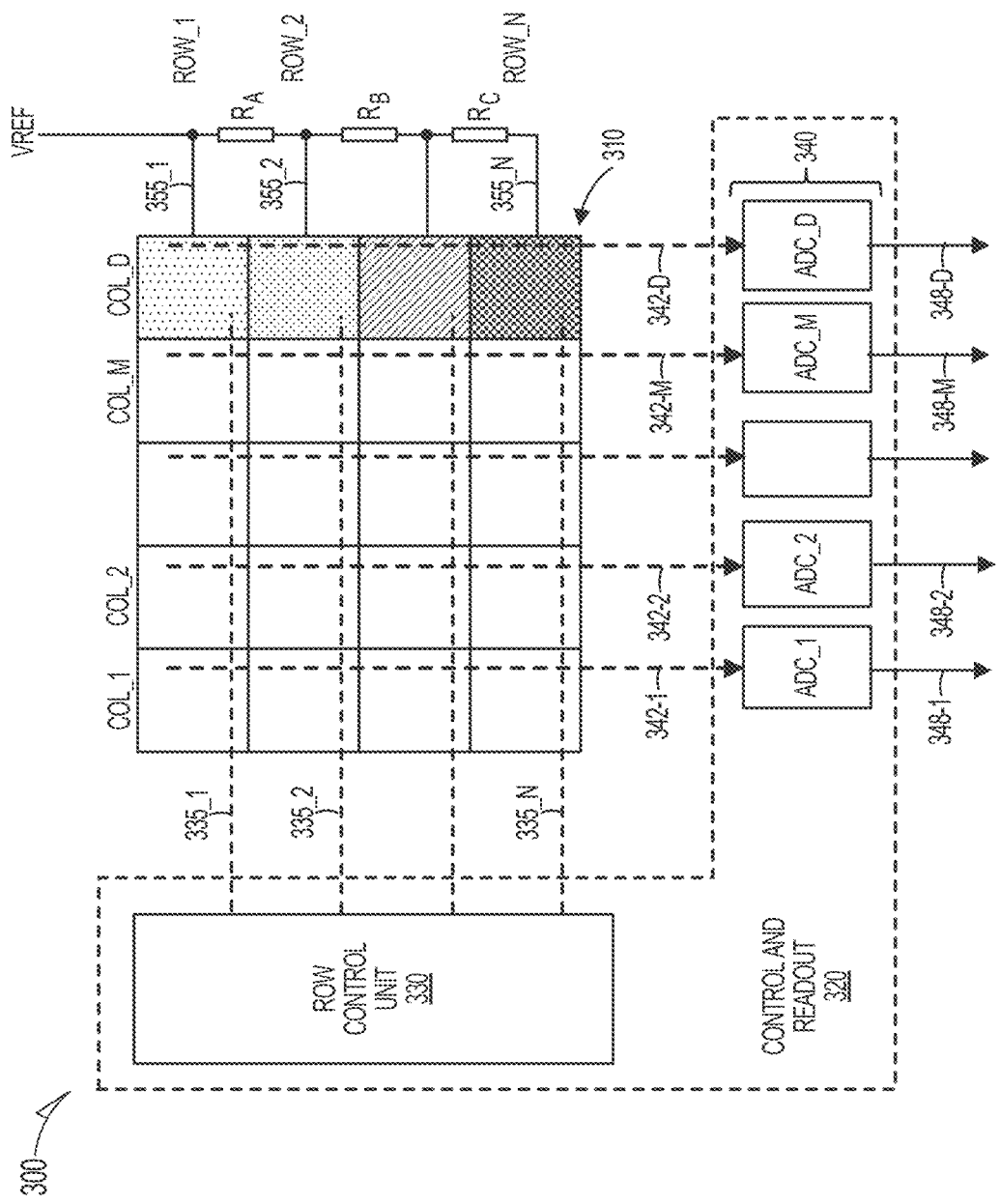
FIG. 3 shows an example schematic diagram of an imaging system in accordance with an aspect of the present disclosure.

FIG. 3 shows an example schematic diagram of an imaging system 300 in accordance with an aspect of the present disclosure. The system 300 includes an image sensor 310 that comprises a plurality of imaging pixels (represented by the unshaded boxes) arranged in a matrix of N rows and M columns. Each imaging pixel is configured to accumulate charge in dependence on light incident on the imaging pixel and each pixel may be configured, for example, as shown in FIG. 1 (or in any other way, such as a differential pixel, etc). The image sensor 310 also includes a plurality of diagnostic pixels (represented by the shaded boxes). Each diagnostic pixel may be configured in the same was as each of the imaging pixels, except rather than being configured to accumulate charge they are each coupled to a reference voltage, as explained earlier in relation to FIG. 2. In this example, the plurality of diagnostic pixels are arranged as a column, Col_D.

The imaging system 300 also includes control and readout circuitry 320 that is configured to select one or more of the imaging pixels and, for each selected imaging pixel, readout an imaging signal that is indicative of the charge accumulated on the selected imaging pixel. It is also configured to select at least one of the diagnostic pixels and readout a diagnostic signal that is indicative of the reference voltage of the selected diagnostic pixel. For these purposes, the control and readout circuitry 320 may comprise row control circuitry 330 that is configured to control the selection and readout of pixels on a row-by-row basis. For this purpose, the imaging system 300 comprises N row control lines 335_N, each of which may in fact comprise multiple lines for carrying multiple control signals. For example, in the arrangement of FIG. 1, three control signals are required to control the selection and readout of pixels i.e., TX, RESET and SELECT. Therefore, whilst each of the N row control lines 335_N are shown in FIG. 3 as a single line for the sake of clarity, in practice they may each include multiple lines, one for each of TX, RESET and SELECT for example. As can be seen, each of the row control lines 335_N is shared by all of the imaging pixels and the diagnostic pixel in the row. Consequently, the row control unit 330 is configured to control the selection and readout of all imaging pixels and the diagnostic pixel in a particular row in parallel. For each selected imaging pixel, an imaging signal is readout via their common, column readout line 342_M. For example, the imaging signal for the selected imaging pixel in Col_1 is readout via readout line 3421, the imaging signal for the selected imaging pixel in Col_2 is readout via readout line 342_2, the imaging signal for the selected imaging pixel in Col_M is readout via readout line 342_M, etc. Each readout imaging signal, for example each imaging voltage, is indicative of the charge accumulated on the respective imaging pixel, as explained earlier with reference to FIG. 1.

As can be seen in FIG. 3, each of the row control lines 335_N is also coupled to a respective one of the N diagnostic pixels such that the row control unit 330 controls the selection and readout of the diagnostic pixels in exactly the same way as the imaging pixels. For each selected diagnostic pixel, a diagnostic signal is readout via the common, column readout line 342_D at the same time as the imaging signals are readout via the lines 342_1 to 342_M. The diagnostic signal is indicative of the reference voltage for the selected diagnostic pixel, but may not be exactly the same as the reference voltage as a result of noise, etc.

The analog signals readout via the common column readout lines may be digitally converted by analog to digital converters (ADCs) 340. In this example, there is one ADC for each readout line so that conversion of each of the readout signals may take place in parallel. However, in an alternative, there may be fewer ADCs than readout lines (potentially only one ADC) with the control and readout circuitry 320 also comprising one or more multiplexers in order to multiplex two or more signals to each ADC. In a further alternative, there may be more ADCs than readout lines, for example two or more ADCs for each readout line. The digital representations 348 of the imaging signals and the diagnostic signal are output from the control and readout circuitry 320. In an alternative, the ADCs 340 may be omitted and the readout imaging signals and diagnostic signal may be output from the control and readout circuitry 320 as analog signals, either for digital conversion elsewhere, or for further processing/analysis in the analog domain.

In this example, the reference voltage for each of the diagnostic pixels is different. In the example of FIG. 3, this is achieved by taking a reference voltage Vref (for example, from any suitable voltage reference generator, such as a bandgap voltage reference), and using a potential divider network, $R_A$ to $R_C$, to generate N different references 355_N. However, it may alternatively be achieved in any other suitable way, for example using N independent reference voltages, etc.

By setting the voltage reference to be different for each diagnostic pixel, the diagnostic signal readout from each diagnostic pixel may be used as a unique row ID. For example, the control and readout circuitry 320 may readout the image sensor 310 on a row-by-row basis. When the signals are readout from one row of pixels, it may move on to select and readout the signals from the next row, until all rows of pixels have been readout. Each row of imaging signals will be accompanied by a diagnostic signal that should uniquely identify the row. As a result, if the row control unit 330 has a fault and selected rows in the incorrect order, for example selecting row 1 followed by row 3 followed by row 2, rather than working through the rows in numerical order, this may be detected using the diagnostic signal that is readout for each row, since the rows identified by the diagnostic signals will be in the incorrect order. In contrast, without the diagnostic pixels of the present disclosure, it would simply be assumed that the pixel data being readout from the image sensor is being readout in the correct order.

In order to use the diagnostic signals, when a row of imaging signals is output as digital values 348_1 to 348_M, the accompanying digital value 348_D may be compared with the known/pre-determined voltage references 355_1 to 355_N. If the diagnostic signal is the same as one of the reference voltages, to within an acceptable degree of accuracy (for example is within +/−1%, or +/−2%, etc, of a reference voltage 355_1 to 355_N), then the imaging signals 348_1 to 348_M are known to come from the row corresponding to that reference voltage. This takes into account inherent inaccuracies in the diagnostic signal, for example as a result of signal noise, digital conversion inaccuracies, and variability in the reset level of the diagnostic pixels. The level of the voltage references 355_1 to 355_N may, for example, be stored in memory along with the corresponding row number, so that the known/pre-determined voltage reference levels and corresponding row number may be looked up for the purposes of this diagnostic process. The diagnostic processes may be performed by any suitable processor, such as a diagnostics unit that is part of the imaging system (or is external to the imaging system), or by any other type of image processor that is configured to perform this diagnostic function in addition to its usual image processing functions.

Furthermore, because the diagnostic pixels use the same pixel selection and readout control signals as the imaging pixels, other types of imaging system errors/faults may be identified using the diagnostic signals. For example, it may be determined that the SELECT signal is stuck on low for a particular row (for example because it results in the diagnostic signal indicating the wrong row ID) and/or that the SELECT signal is stuck on high for a particular row (for example because the diagnostic signals for all other rows will be corrupted and therefore indicate the wrong row IDs) and/or that there are faults on either one of the REST and/or TX signals and/or that the order of control signal operations are wrong (for example, RESET and TX signals being pulsed in the wrong order).

Furthermore, it can be seen that in this example the diagnostic pixel column Col_D is positioned on the opposite side of the image sensor 310 to where the control and readout lines 335_1 to 335_N receive the control and readout signals from the row control unit 330. In particular, the control and readout lines 335_1 to 335_N run in rows across the image sensor 310, with the signals travelling from one side of the image sensor 310 to the other. The diagnostic pixel column Col_D is positioned on the far side of the image sensor 310 to where those signals start, which means that if there is some sort of a fault anywhere along any of the control and readout lines 335_1 to 335_N, it should affect the diagnostic pixel and therefore be reflected in the readout diagnostic signal.

Figure 4:
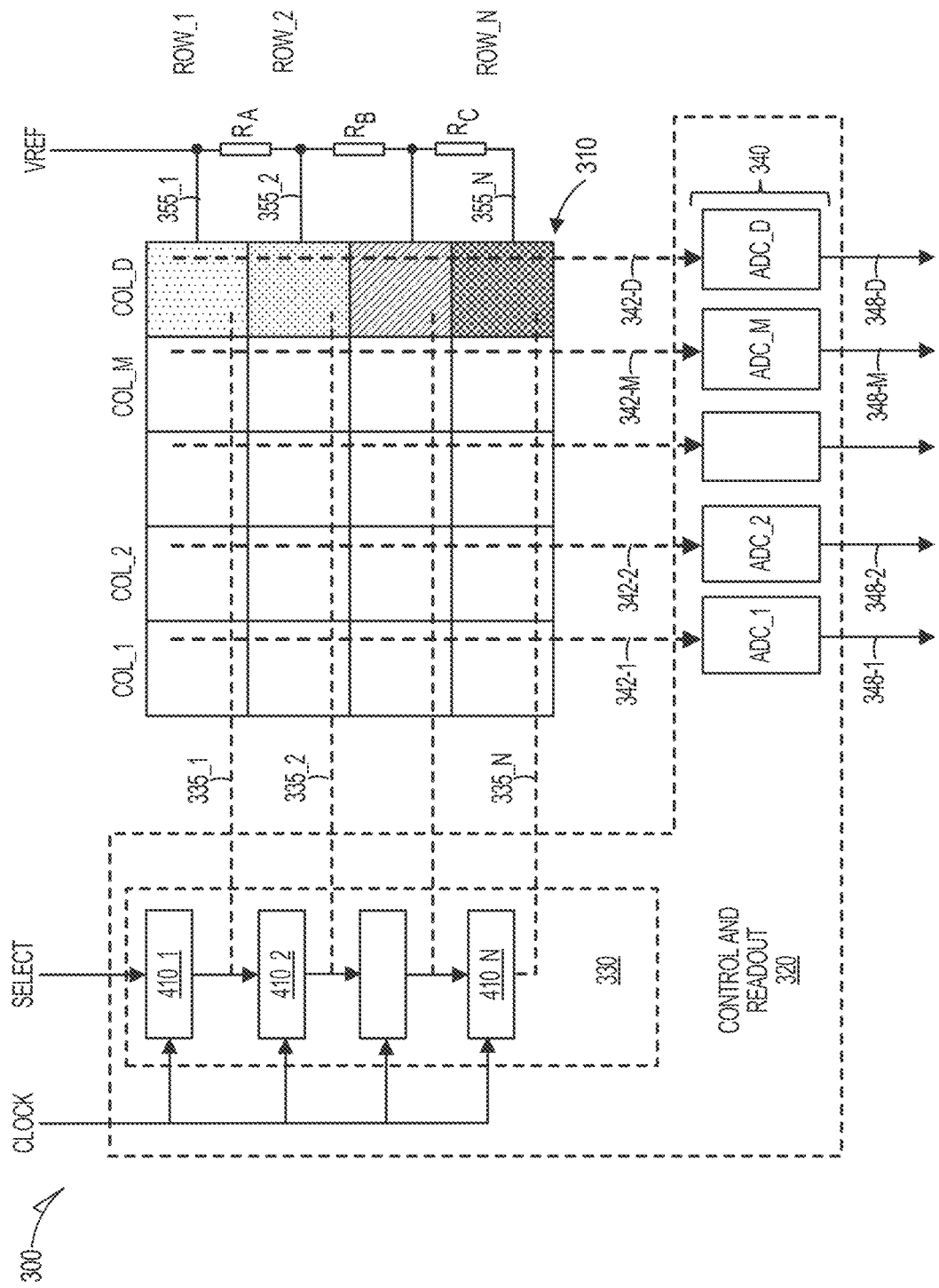
FIG. 4 shows an example schematic diagram of further details of the imaging system of FIG. 3.

FIG. 4 shows some further example details of the control and readout circuitry 330—specifically the circuitry related to the timing of the SELECT signals to each row (circuitry relating to the RESET and TX signals is not also shown, for the sake of clarity). These details are represented merely to assist in understanding an example operational implementation of part of the control and readout circuitry 320, showing an example of how the circuitry may be configured to consecutively select one row at a time. In this example, a shift register is made up of a series of cascaded flip-flops 410_1 to 410_N in order to shift the SELECT pulse from one row to the next using the clock signal. Control signal timing and operation may be achieved in many different ways and that this is merely one particular, illustrative example.

The inventors have recognised that the diagnostic pixel implementation of FIGS. 3 and 4 may be difficult to realise for large imaging arrays, for example having 1000 or more rows. In particular, a unique reference signal would be needed for each row. This would mean that there may be very limited differences between adjacent reference signals, thereby placing stringent requirements on accuracy levels, for example requiring a high accuracy voltage reference, high accuracy potential dividers, very low signal noise and very high ADC conversion accuracies. This may not be realistically achieved in many imaging systems. Furthermore, Vref may also be quite small, for example 1.2V, meaning that a large number of unique levels may need to be used within a relatively small voltage range, which further exacerbates the difficulties.

Figure 5:
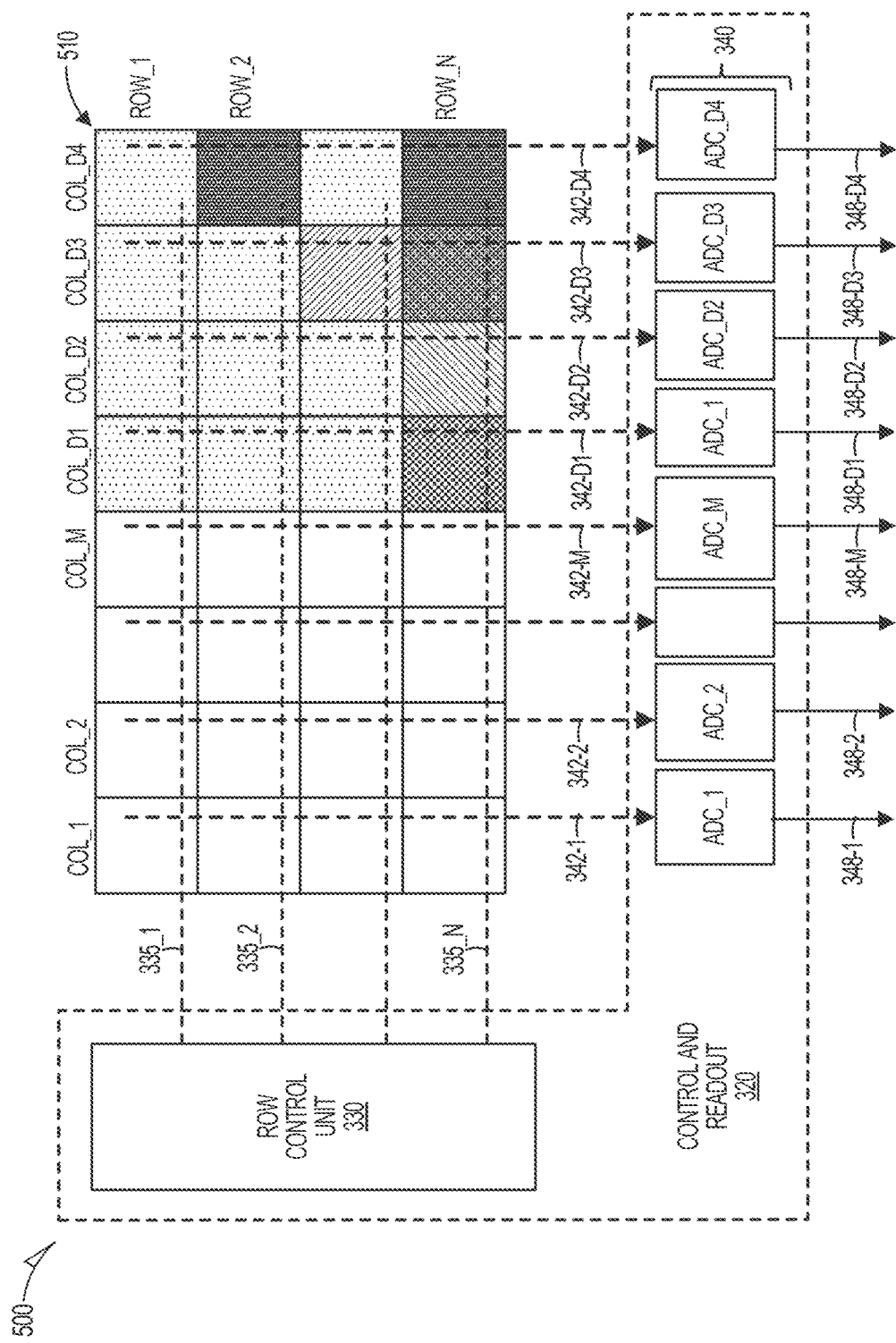
FIG. 5 shows an example schematic diagram of an imaging system in accordance with a further aspect of the present disclosure.

FIG. 5 shows an example implementation of an imaging system 500 in accordance with the present disclosure. In this example, rather than having a single column of diagnostic pixels, a plurality of diagnostic pixel columns are used (in this example, four reference columns Col_D1 to Col_D4, although there may alternatively be any suitable number, such as two columns, three columns, five columns, six columns, etc). The reference voltage for each diagnostic pixel may be set such that the combination of reference voltages for each row is different. For example, if only two reference voltage levels are available (i.e., high, such as 1V, and low, such as 0.2V), it can be seen that in this example of four columns of diagnostic pixels, each row of diagnostic pixels may effectively represent a 4-bit digital word. Therefore, 16 rows may be uniquely identified using only two voltage references. This number may be increased by adding more columns of diagnostic pixels and/or increasing the number of voltage reference levels available. For example, if 8 different voltage levels are available, each diagnostic pixel may effectively produce 3-bits of ID data (eg, 000 if it is set to the lowest voltage reference, 001 if it is set the next lowest voltage reference, 111 if it is set to the highest voltage reference, etc). Therefore, for four columns of diagnostic pixels, as shown in FIG. 5, each row ID may comprise 12-bits (3-bits from each diagnostic pixel in the row), such that 4096 rows may be uniquely identified. This is shown in FIG. 5 by using different types of diagnostic pixel shading for different reference voltage levels.

The coupling of the diagnostic pixels to the different voltage reference levels is not shown in FIG. 5 for the sake of clarity. However, it will be appreciated that it may be achieved in any suitable way, for example by setting the different reference signal levels using a voltage reference (for example, from a bandgap voltage reference) and potential divider network, and then coupling each diagnostic pixel to the appropriate reference signal.

Table 1 below shows an example of how the reference signals for each diagnostic pixel may be set. In this example, there are four reference levels, r0 to r3, meaning that each diagnostic pixel may contribute two bits to an eight bit row ID.

TABLE 1

| Row # | Col_D1 | Col_D2 | Col_D3 | Col_D4 | Row ID |
|---|---|---|---|---|---|
| 0 | r0 | r0 | r0 | r0 | 00000000 |
| 1 | r0 | r0 | r0 | r1 | 00000001 |
| 2 | r0 | r0 | r0 | r2 | 00000010 |
| 3 | r0 | r0 | r0 | r3 | 00000011 |
| 4 | r0 | r0 | r1 | r0 | 00000100 |
| 5 | r0 | r0 | r1 | r1 | 00000101 |
| ... | ... | ... | ... | ... | ... |
| 25 | r0 | r1 | r2 | r2 | 00011010 |
| 26 | r0 | r1 | r2 | r3 | 00011011 |
| 27 | r0 | r1 | r3 | r0 | 00011100 |
| 28 | r0 | r1 | r3 | r1 | 00011101 |
| 29 | r0 | r1 | r3 | r2 | 00011110 |
| 30 | r0 | r1 | r3 | r3 | 00011111 |
| 31 | r0 | r2 | r0 | r0 | 00100000 |
| ... | ... | ... | ... | ... | ... |
| 253 | r3 | r3 | r3 | r1 | 11111101 |
| 254 | r3 | r3 | r3 | r2 | 11111110 |
| 255 | r3 | r3 | r3 | r3 | 11111111 |

The inventors have recognised that, where more than two different voltage reference levels are available to be used for each diagnostic pixel, offset and/or gain variations in the references used by each of the diagnostic pixels may be a source of error in the diagnostic processes performed using the readout diagnostic signals. For example, there may be some offset and/or gain variations in the reference setting circuitry across the image sensor 510 such that a mid-level reference voltage (for example) is slightly different for a row at one end of the image sensor 510 compared with a row at the other end, as a result of offset and/or gain in the circuitry applying the reference level to the diagnostic pixels. This may result in some errors in identifying the correct row number from the reference signals 348_D1 to 348_D4.

This may be resolved by having one column of diagnostic pixels that are always set to either the minimum or maximum reference level. For that column of diagnostic pixels, rows may alternate between receiving the maximum and minimum reference signal levels. For the remaining diagnostic pixels, their diagnostic signals may be categorised into any of the n different reference signal levels by comparing the readout diagnostic signal against thresholds that are determined based on the diagnostic signal readout from the max/min diagnostic pixel, and the diagnostic signal readout from an adjacent diagnostic pixel (such that then the max and min reference levels are found). This means that any offset and/or gain in the reference signals sent to a pair of rows should be reflected in the max and min reference signals, which in turn will result in an appropriate adjustment to the threshold levels used to determine the reference level at which the remaining diagnostic pixels have been set in those rows.

For example, the difference between the max and min reference levels may be defined as the 'range'. If there are, for example, nine different reference levels to which the diagnostic pixels could be set, eight thresholds need to be determined in order to have a threshold between each adjacent reference level. The readout diagnostic signals can then be compared to the thresholds in order to find the reference level at which each diagnostic pixel is set. Each threshold, n, may be found as follows:

$$\text{Threshold}(n) = (2n+1) * \text{range}/2 * (no. \text{ of reference levels} - 1)) + \text{minimum reference level}$$

If we take the example of there being nine reference levels, and therefore eight thresholds, the range may be divided by 16 (i.e., 2*(9-1)) and the thresholds set at 1/16 of the way between the min and max (i.e. 1/16 of the range+the minim reference level), 3/16 of the way between the min and max, 5/16 of the way between the min and max, etc, up to 15/16 of the way between the min and the max. In this way, the thresholds would define the nine reference levels, which would be at 0/16 (i.e., the minimum reference level), 2/16, 4/16, 6/16, etc up to 16/16 (i.e., the maximum reference level).

Therefore, if there are eight thresholds that need to be found in order to define nine reference levels, the lowest threshold n=0 may be found from range/16+minimum reference level. The next lowest threshold n=1 may be found from 3*range/16+minimum reference level, etc.

Table 2 below shows an example of how the reference level for each diagnostic pixel may be set. In this example, there are nine different reference levels, r0 to r8. The minimum of the voltage reference range is r0 and the maximum is r8 (for example, r7 may be derived from a potential divider network, where the voltage across the whole network is r8-r0). The diagnostic pixel column Col_D4 is the column where the diagnostic pixel is set to a reference value of either the maximum, r8, or the minimum, r0. In Col_D4, each row alternates between max and min.

TABLE 2

| Row # | Col_D1 | Col_D2 | Col_D3 | Col_D4 | Row ID |
|---|---|---|---|---|---|
| 0 | r0 | r0 | r0 | r0 | 0000000000 |
| 1 | r0 | r0 | r0 | r8 | 0000000001 |
| 2 | r0 | r0 | r1 | r0 | 0000000010 |
| 3 | r0 | r0 | r1 | r8 | 0000000011 |
| 4 | r0 | r0 | r2 | r0 | 0000000100 |
| 5 | r0 | r0 | r2 | r8 | 0000000101 |
| ... | ... | ... | ... | ... | ... |

TABLE 2-continued

| Row # | Col_D1 | Col_D2 | Col_D3 | Col_D4 | Row ID |
|---|---|---|---|---|---|
| 15 | r0 | r0 | r7 | r8 | 0000001111 |
| 16 | r0 | r1 | r0 | r0 | 0000010000 |
| 17 | r0 | r1 | r0 | r8 | 0000010001 |
| 18 | r0 | r1 | r1 | r0 | 0000010010 |
| 19 | r0 | r1 | r1 | r8 | 0000010011 |
| 20 | r0 | r1 | r2 | r0 | 0000010100 |
| 21 | r0 | r1 | r2 | r8 | 0000010101 |
| ... | ... | ... | ... | ... | ... |
| 1021 | r7 | r7 | r6 | r8 | 1111111101 |
| 1022 | r7 | r7 | r7 | r0 | 1111111110 |
| 1023 | r7 | r7 | r7 | r8 | 1111111111 |

Table 3 shows example digitised values 348 that are output from the control and readout circuitry 320 and represent the diagnostic signals readout from each row of diagnostic pixels.

TABLE 3

| Row # | Col_D1 | Col_D2 | Col_D3 | Col_D4 | Range |
|---|---|---|---|---|---|
| 0 | 10 | 12 | 10 | 11 | 800 |
| 1 | 13 | 12 | 10 | 811 | 800 |
| 2 | 21 | 18 | 123 | 20 | 802 |
| 3 | 20 | 19 | 122 | 822 | 802 |
| ... | ... | ... | ... | ... | ... |
| 16 | 84 | 220 | 78 | 92 | 799 |
| 17 | 85 | 216 | 75 | 891 | 799 |
| 18 | 36 | 180 | 168 | 54 | 801 |
| 19 | 34 | 179 | 170 | 855 | 801 |
| ... | ... | ... | ... | ... | ... |
| 1022 | 789 | 791 | 793 | 66 | 799 |
| 1023 | 788 | 792 | 790 | 865 | 799 |

If we look first at rows 0 and 1, the range of 800 can be found from subtracting the minimum signal value readout from Col_D4, rows 0 and 1 (i.e., 11) from the maximum signal value readout from Col_D4, rows 0 and 1 (i.e., 811). Therefore, the range of this pair of rows is 800. In this case, the lowest comparison threshold, n=0 will be 800/16+11=61. As can be seen, the diagnostic signal levels for the remaining diagnostic pixels, Col_D1 to Col_D3, are all below that threshold, so can all be categorised as being at reference level r0. The other thresholds for n=1 to 6 may, if necessary, be found the same way.

Looking now at rows 16 and 17, the range of 799 can be found from subtracting the minimum signal value readout from Col_D4, rows 16 and 17 (i.e., 92) from the maximum signal value readout from Col_D4, rows 16 and 17 (i.e., 891). Therefore, the range of this pair of rows is 799. In this case, the lowest comparison threshold, n=0 will be 799/16+92=141. The next lowest comparison threshold, n=1 will be (3*799)/16+92=241. The remaining comparison thresholds may be found in similar ways.

For rows 16 and 17, the diagnostic signal levels for Col_D1 and Col_D3 are below the threshold n=0, so they can be categorised as being at reference level r0. It should be noted that those signal levels are above the threshold n=0 that was determined for rows 1 and 2, which demonstrates that in this example, if fixed, predetermined thresholds were used for all rows, a classification error may be made for at least some of the diagnostic pixels in rows 1 and 2 and/or in rows 16 and 17.

The diagnostic signal level for Col_D2 on rows 16 and 17 is between the thresholds for n=0 and n=1 for those rows, so that can be categorised as being at reference level r1. Therefore, row 16 can be found to be at r0, r1, r0, r0, which gives a Row ID of 0000010000. Row 17 can be found to be at r0, r1, r0, r8, which gives a Row ID of 0000010001.

Finally, looking at rows 1022 and 1023, the range of 799 can be found from subtracting the minimum signal value readout from Col_D4, rows 1022 and 1023 (i.e., 66) from the maximum signal value readout from Col_D4, rows 1022 and 1023 (i.e., 865). Therefore, the range of this pair of rows is 799. In this case, the lowest comparison threshold, n=0 will be 799/16+66=115. The highest comparison threshold, n=6 will be (13*799)/16+66=715. The remaining comparison thresholds may be found in similar ways. For rows 1022 and 1023, the diagnostic signal levels for Col_D1 to Col_D3 are all above threshold n=6, so they can be categorised as being at reference level r7. Therefore, row 1022 can be found to be at r7, r7, r7, r0, which gives a Row ID of 1111111110. Row 1023 can be found to be at r7, r7, r7, r8, which gives a Row ID of 1111111111.

Therefore, it can be seen that the relevant comparison thresholds to be used for pairs of rows can be determined using the diagnostic signal values from Col_D4 for those rows. Each of the diagnostic signals readout from Col_D1 to Col_D3 for the pair of rows can then be compared against the thresholds in order to determine the reference level of each diagnostic pixel in the pair of rows, and therefore determine the row IDs of the pair of rows. Whilst FIG. 5 shows a single row being readout at a time, some imaging system may be configured to readout pairs of rows in parallel (for example rows 1 and 2 being selected and readout simultaneously). If a single row is readout at a time, the digital diagnostic signals 348_D1 to 348_D4 for the first row of a pair may be stored, for example in memory and then accessed for use in row ID determination after the digital diagnostic signals 348_D1 to 348_D4 for second row of the pair have been readout. This process may be performed within the imaging system, for example by a diagnostic unit, or it may be performed by some other processor/system that receives the digital output of the control and readout circuitry 320.

In this example, there are nine reference levels, but the pixels in columns D1-D3 are only set to eight of the reference levels (r0-r7). Nine reference levels have been used in this example even though only eight reference levels are required for columns D1 to D3 since using nine reference levels simplifies the setting of the threshold levels. This is because the reference levels are then set using a divide by 8 algorithm, which makes the algorithm easier to execute in the digital logic since it is a power of two. In an alternative, the pixels in any of columns D1-D3 may be set to any of the reference levels, including the max and min reference levels (in this example, any of r0-r8). Furthermore, whilst nine reference levels have been used in this example, any number may be used, for example six, or seven, or eight, or 10, etc, in consideration of the number of diagnostic pixel columns, the accuracy with which the reference signal may be set for each diagnostic pixel and the number of rows that need to be uniquely identified.

Figure 6:
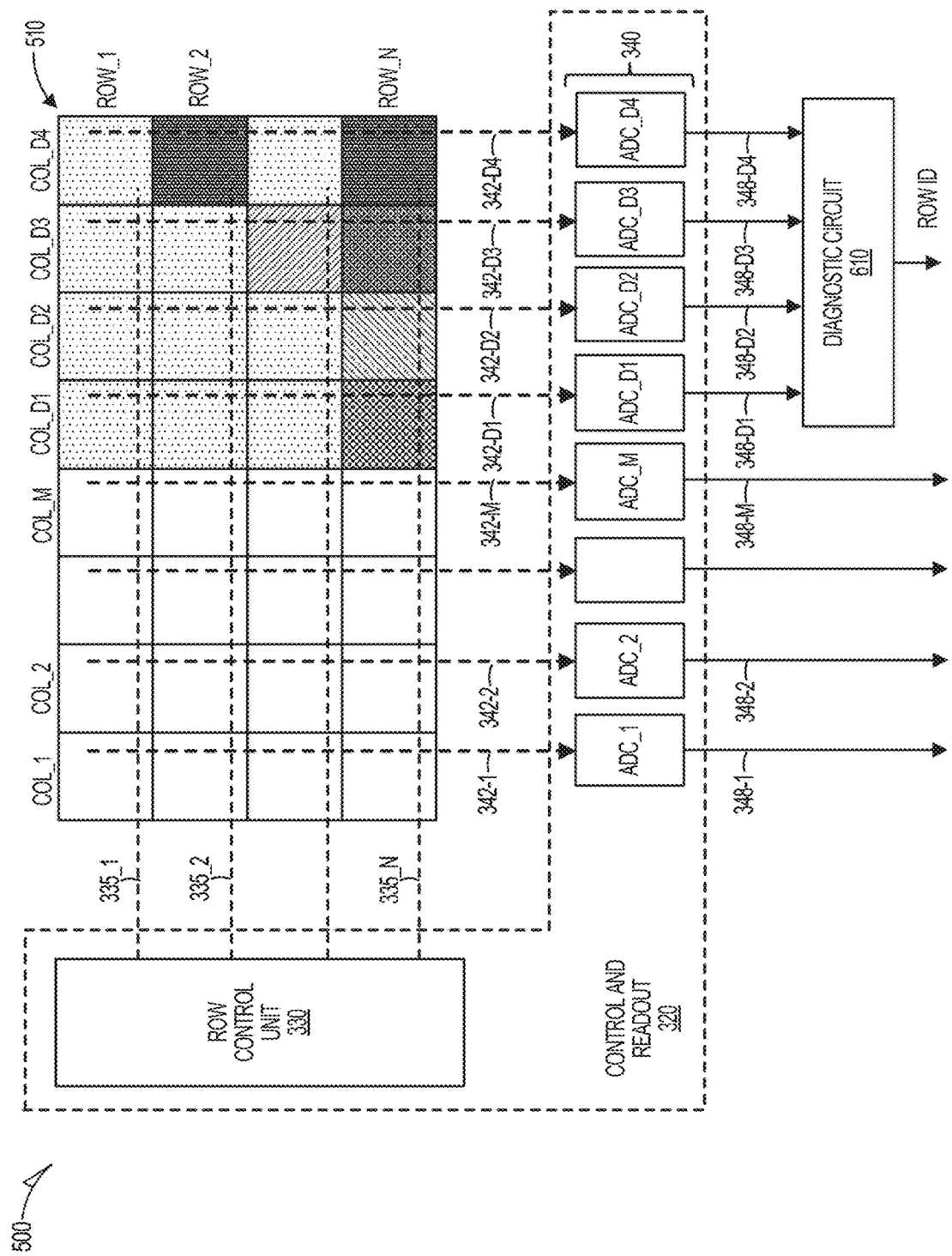
FIG. 6 shows an example schematic diagram of an imaging system in accordance with a further aspect of the present disclosure.

FIG. 6 shows an example of the former case, where a diagnostic unit 610 receives the digital values 348_D1 to 348_D4, determines the row ID as descried above, and then outputs a row ID to accompany the imaging data 348_1 to 348_M for each row. In addition, the diagnostic unit 610 may optionally perform any other suitable diagnostic operations, for example by detecting out of sequence row IDs, or repeated row IDs (for example caused by control signals that are stuck high), etc. In this case, the diagnostic unit 610 may optionally be configured to output fault data whenever a fault is found, which may in some cases simply indicate that a fault has been detected and in other cases may indicate the nature of the fault if the diagnostic unit 610 has been configured to make such determinations.

Figure 7:
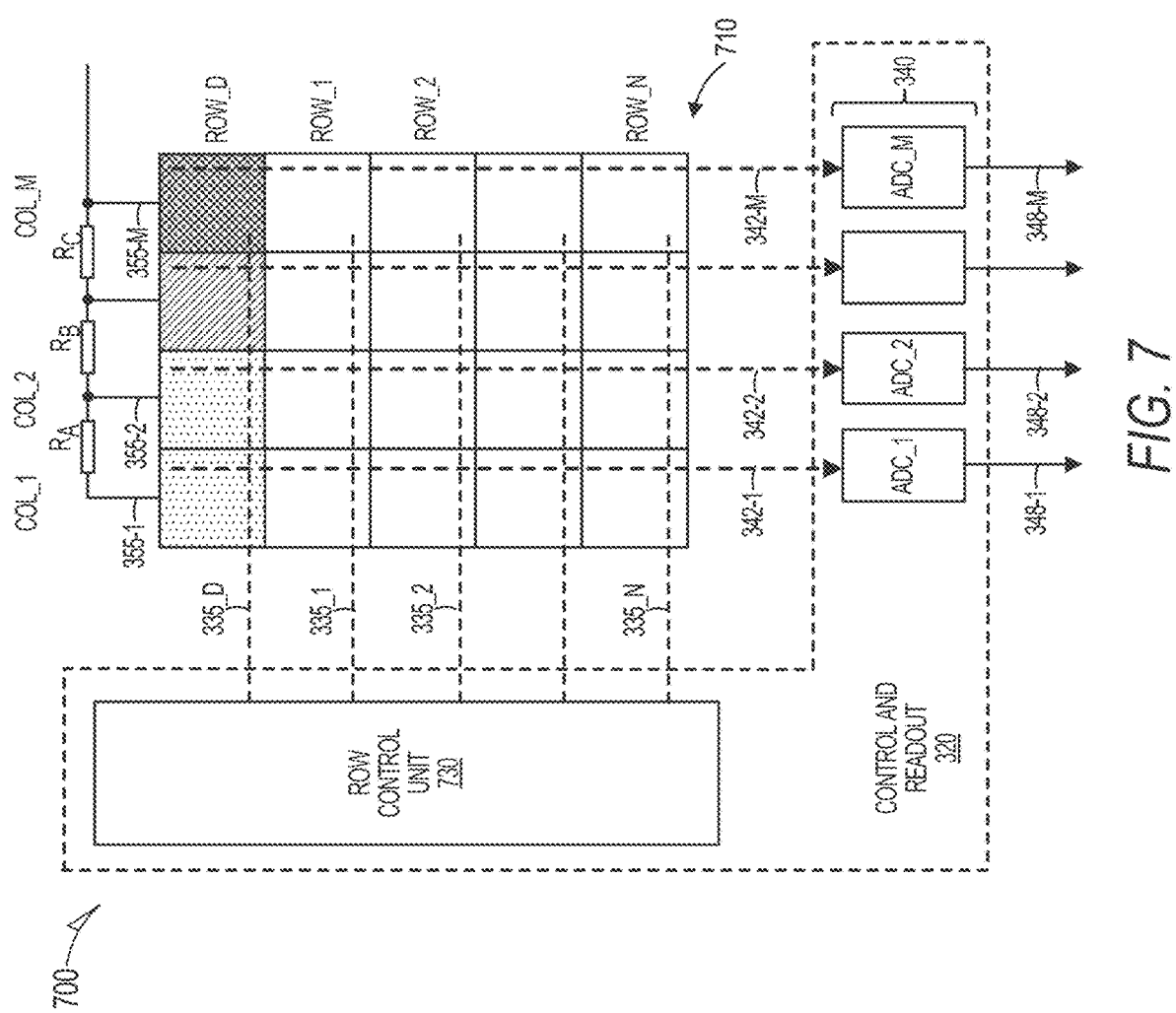
FIG. 7 shows an example schematic diagram of an imaging system in accordance with a further aspect of the present disclosure.

FIG. 7 shows a further example implementation of an imaging system 700 in accordance with an aspect of the disclosure, wherein the diagnostic pixels are arranged as a row of pixels Row_D rather than a column. The examples of FIGS. 3 to 6 may be seen as representing a first plurality of diagnostic pixels that are arranged as one or more columns. FIG. 7 may be seen as representing a second plurality of diagnostic pixels that are arranged as a single row.

The operation of the imaging system 700 is very similar to that of FIGS. 3 to 5. Each of the M diagnostic pixels is set with a different reference 355_1 to 355_M, which are each derived from the primary reference Vref using a potential divider network. The row control unit 730 is configured to control the selection and readout of the diagnostic signals from the diagnostic pixels using the control signal lines 335_D. Selection and readout of the diagnostic signals may be performed in exactly the same way as that of the imaging signals readout from the imaging pixels. In this example, the voltage reference to which each diagnostic pixel is set may act as a column ID, such that by reading out Row_D and comparing the readout diagnostic signals to the diagnostic pixel reference values 355_1 to 355_M (or comparing to appropriately set thresholds), each column may be uniquely identified. Therefore, if there is some sort of error in the readout lines 342_1 to 342_M and/or in the ADCs 340, that cause the column readout ordering to be incorrect, it may be identified. Furthermore, if any one or more of the readout lines 342_1 to 342_M are stuck at a particular voltage or are broken, that should also be identified by the column ID being incorrect. This is particularly true in the example of FIG. 7 where the diagnostic pixel row is positioned on the opposite side of the image sensor 710 to the side at which the readout lines 342_1 to 342_M output the imaging signals and diagnostic signals, since then an error anywhere along the lines should affect the readout diagnostic signals.

A further purpose of the second plurality of diagnostic pixels is that readout of the diagnostic signals uses the same ADCs as are used for reading out the imaging signals. Consequently, if there is any error in any one or more of the ADCs, it should be identified by virtue of one or more incorrect column IDs being found in the digital outputs 348_1 to 348_M when the diagnostic pixels are selected and readout.

Figure 8:
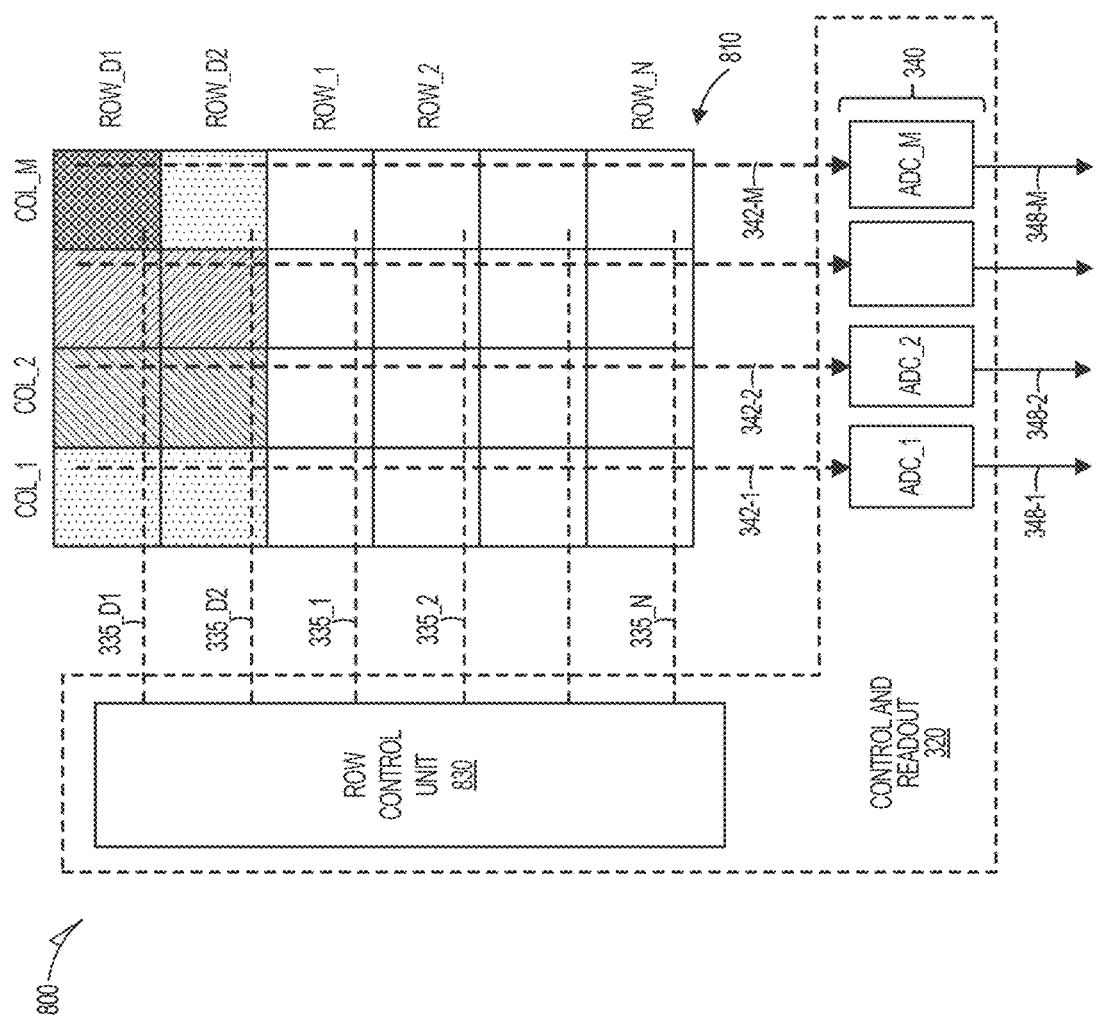
FIG. 8 shows an example schematic diagram of an imaging system in accordance with a further aspect of the present disclosure.

FIG. 8 shows a further example imaging system 800 where the second plurality of diagnostic pixels are similar to the implementation of FIG. 6. In this example, the second plurality of diagnostic pixels are arranged as a plurality of rows (in this example two rows, although more rows may be used, for example three, four, etc). The combination of reference signals used for each column of the second plurality of diagnostic pixels may be different, in much the same way as described with reference to FIG. 6. Therefore, a large number of columns (potentially 1000s) may be uniquely identified by reading out the plurality of diagnostic pixel rows, without requiring high levels of diagnostic pixel reference signal accuracy and/or low noise and/or high accuracy ADCs. Furthermore, since the plurality of diagnostic signals readout for each row of diagnostic pixels will be different, other errors in the ADCs 340 may also be identified. For example, if any of the ADCs are non-operational, this may be detected because by reading out all diagnostic pixel rows they will each be forced to convert different reference voltages at some stage during the diagnostic pixel readout. This may require the reference voltages in each column to be set such that they are not all the same, for example set such that at least one diagnostic pixel in each column of diagnostic pixels is set to a reference signal level that is different to the reference signal level of at least one other of the diagnostic pixels in the column. Therefore, if any ADC outputs the same (either identical or similar to within defined tolerances, such as +/−1%, +/−2%, etc) digital value for each of the diagnostic signals it converts, it may be detected that the ADC is faulty.

Figure 9:
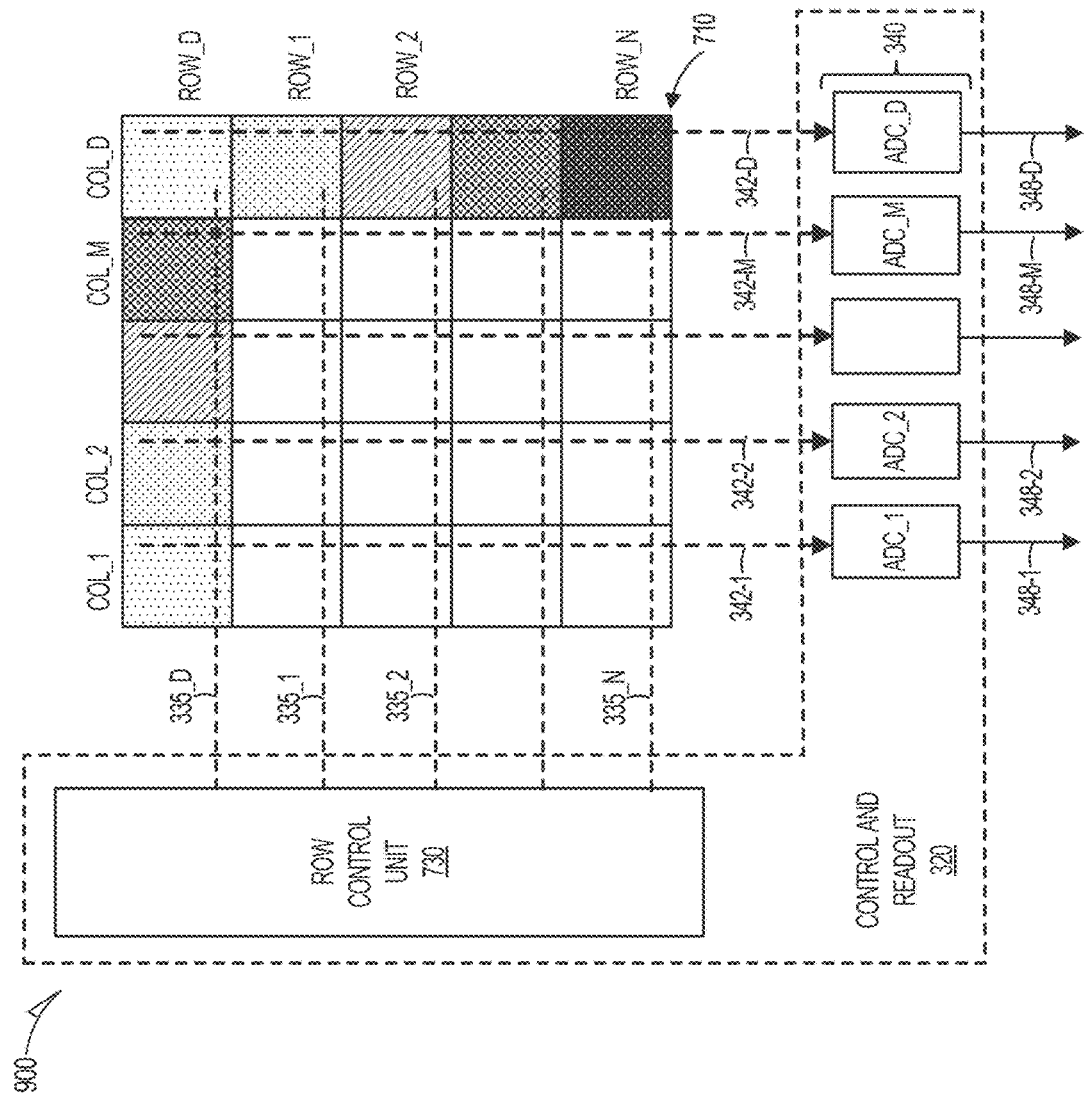
FIG. 9 shows an example schematic diagram of an imaging system in accordance with a further aspect of the present disclosure.

FIG. 9 shows a further example imaging system 900 in accordance with an aspect of the present disclosure. This example includes both the first plurality of diagnostic pixels and the second plurality of diagnostic pixels, so that both row IDs and column IDs may be determined. This example shows a single column of diagnostic pixels (as per FIGS. 3 and 4) and a single row of diagnostic pixels (as per FIG. 7). In an alternative, it may include a plurality of columns of diagnostic pixels (as per FIG. 5) and/or a plurality of rows of diagnostic pixels (as per FIG. 8).

Figure 10:
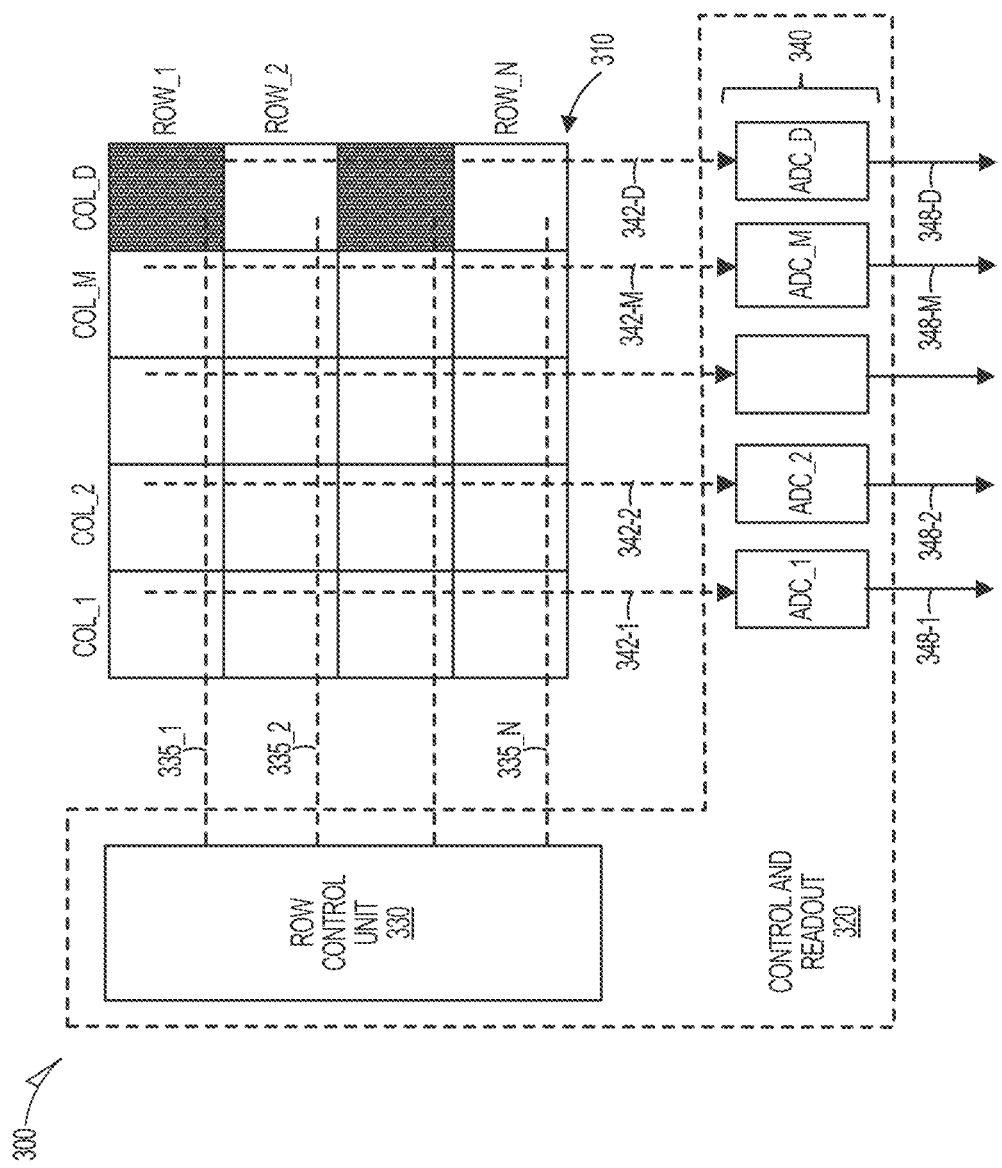
FIG. 10 shows an example schematic diagram of an imaging system in accordance with a further aspect of the present disclosure.

FIG. 10 shows an example implementation of the imaging system 300 where, rather than coupling each of the diagnostic pixels to a reference signal, each of the diagnostic pixels are imaging pixels (for example, of the type represented in FIG. 1) and some are selectively shaded. In this example, the diagnostic pixels may be referred to as "diagnostic imaging pixels", since they are used for diagnostics and are pixels of a design that is capable of imaging. In FIG. 10, the selectively shaded diagnostic pixels are represented with dark shading. As a result of the shading forcing those diagnostic imaging pixels to be dark, or very close to dark, incident light should not cause any charge accumulation (or just a negligibly small amount of charge accumulation) on the pixels. In contrast, the unshaded diagnostic imaging pixels, which are the white diagnostic pixels in FIG. 10, should accumulate charge in response to incident light.

In the example of FIG. 10 where there is only one column of diagnostic imaging pixels, whilst each row is not uniquely identifiable, some types of errors may be detected by virtue of the alternating pattern of shaded and unshaded diagnostic imaging pixels. For example, if the pixels are being read out one row at a time (for example, row 1, then row 2, then row 3, etc), the readout diagnostic signal 342_D, 348_D should alternate between a high and low signal. If two consecutive rows read out both with high, or both with low, diagnostic signals, it indicates a row selection/readout error (for example, reading out row 1 followed by row 3 rather than row 2).

Diagnostic pixel shading may also be used in each of the arrangements of FIGS. 5 to 9, rather than using reference signals. For example, since each diagnostic imaging pixel effectively represents 1-bit of information (shaded or not-shaded), by including multiple columns and/or rows of diagnostic pixels, each row and/or column may be uniquely identified. This is very similar to FIGS. 5 and 8. For example, by having 10 columns of diagnostic imaging pixels, 1000 rows of pixels may be uniquely identified using the diagnostic imaging pixels and/or by having 10 rows of diagnostic imaging pixels, 1000 columns of pixels may be uniquely identified using the diagnostic imaging pixels.

Using shading for diagnostic imaging pixels may only be effective when the image sensor 310 is imaging a scene with sufficient light to distinguish shaded and unshaded pixels from the readout diagnostic signals 342_D, 348_D. However, for some applications, such as industrial applications, the light levels of the scene may be reliably high at all times, such that this alternative implementation may be very effective.

Figure 11:
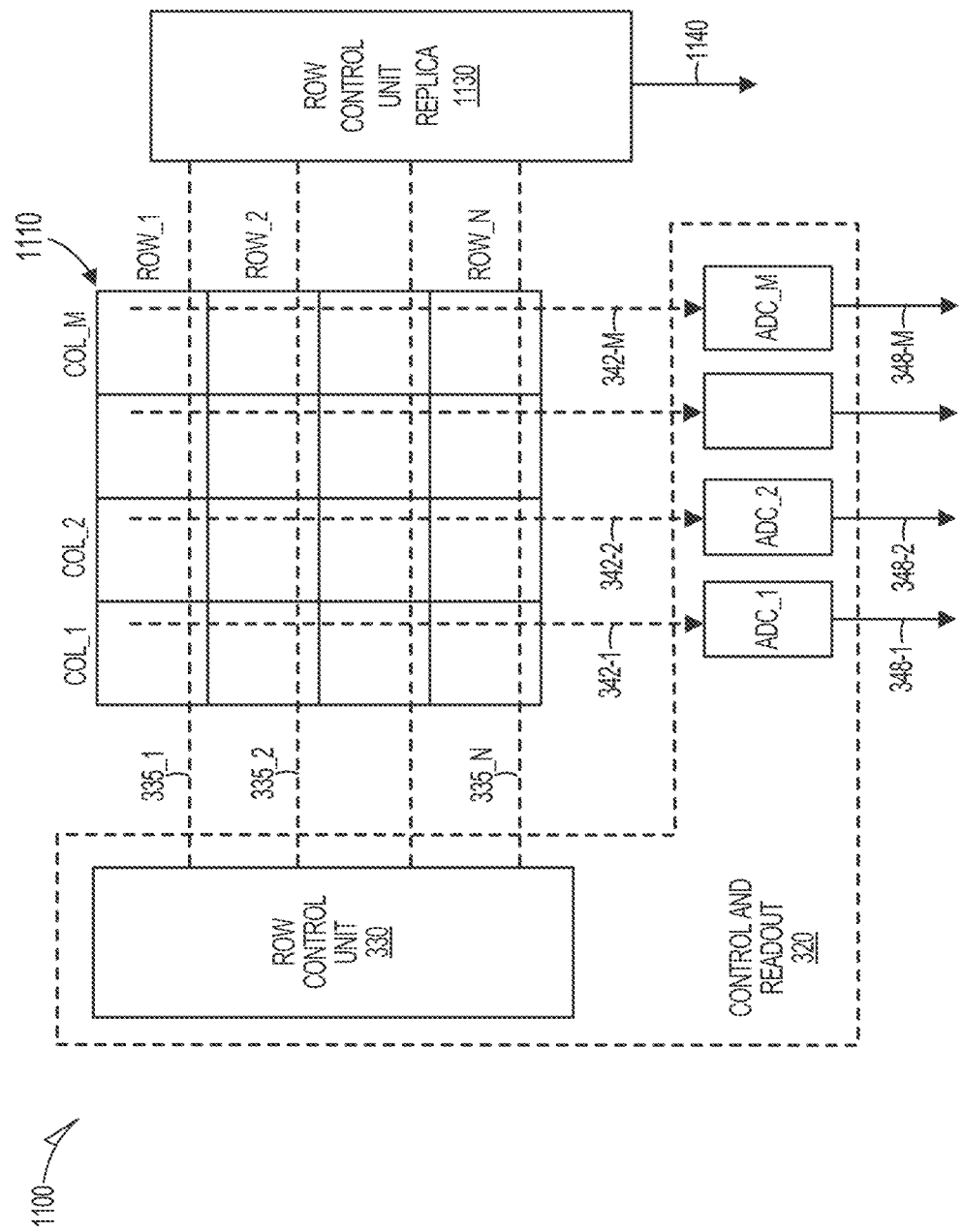
FIG. 11 shows an example schematic diagram of an imaging system in accordance with a further aspect of the present disclosure.
Figure 12:
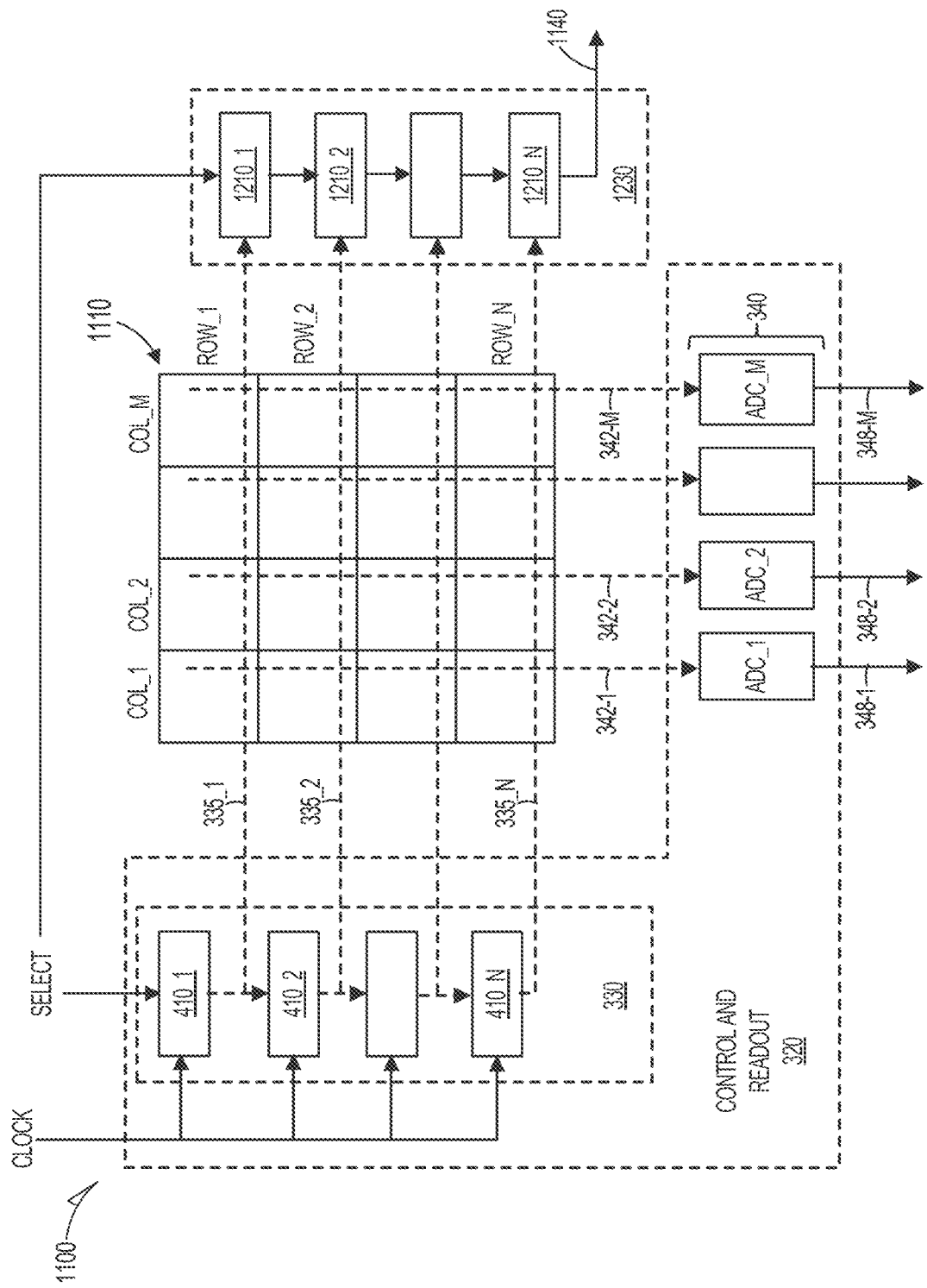
FIG. 12 shows further details of an example implementation of the system of FIG. 11.

FIG. 11 shows a further example imaging system 1100 in accordance with an aspect of the present disclosure. In this example, the image sensor 1110 does not include any diagnostic pixels. Instead, the imaging system 1100 comprises diagnostic circuitry, which in this is example is a row control unit replica 1130, for detecting faults in the row selection process. The row control unit replica 1130 is configured to be a replica of the row control unit 330 and is coupled to the row control lines 335_n so as to receive the row selection control signals put onto those lines by the row control unit 330. The row control unit replica 1130 may also receive at least some of the same input signals as the row control unit 330 (as can be seen in FIG. 12 below) and is configured to operate in the same way as the row control unit 330. The row control unit replica 1130 is configured to output a value/signal 1140 that may be used to determine whether control of row selection is being executed properly.

FIG. 12 shows details of one example implementation of the row control unit 330 and row control unit replica 1130. The row control unit 330 is the same as that represented in FIG. 4 and operates in the same way. The row control unit replica 1130 comprises a series of cascaded flip-flops 1210_1 to 1210_N that are of the same type as the flip-flops 4101 to 410_N. The clock input of each of the flip-flops 1210_1 to 1210_N is coupled to a respective row control line 335_1 so that the row selection signals on the row control lines 335_n act to clock the flip-flops 1210_1 to 1210_N. The data input of the first flip flop 1210_1 is coupled to the same SELECT signal as the flip-flop 4101, and the data output of each flip-flop 1210_1 to 1210_N–1 is coupled to the data input of the next flip-flop 1210_2 to 1210_N. As a result, when the signal on row control line 335_1 goes high, the select signal at the data input of flip-flop 12101 should be clocked to the data output of flip-flop 1210_1. It can therefore be seen that if the row control unit 330 and row control lines 335_1 to 335_N are all operating correctly, just as the select signal should cascade through the flip-flops 410_n, the SELECT signal should likewise cascade through the flop-flops 1210_n. As a result, if everything is working correctly, when the final row N is selected (i.e., when the number of clock signals has reached the total that corresponds to selection of the final row N), the value 1140 should go high. If it does not, it is indicative that there may be fault somewhere in the row control unit 330 and/or control lines 335_n. Optionally, rather than outputting just one value 1140, the data output of each flip-flop 1210_n may be output so that the progress of the select signal through the cascade may be observed.

Whilst FIG. 12 shows one particular example implementation of the row control unit replica 1130, it will be appreciated that the row control unit 330 may be implemented in a number of different ways, and the row control unit replica 1130 may be implemented in any suitable corresponding way so as to replicate the row control unit 330.

Figure 13:
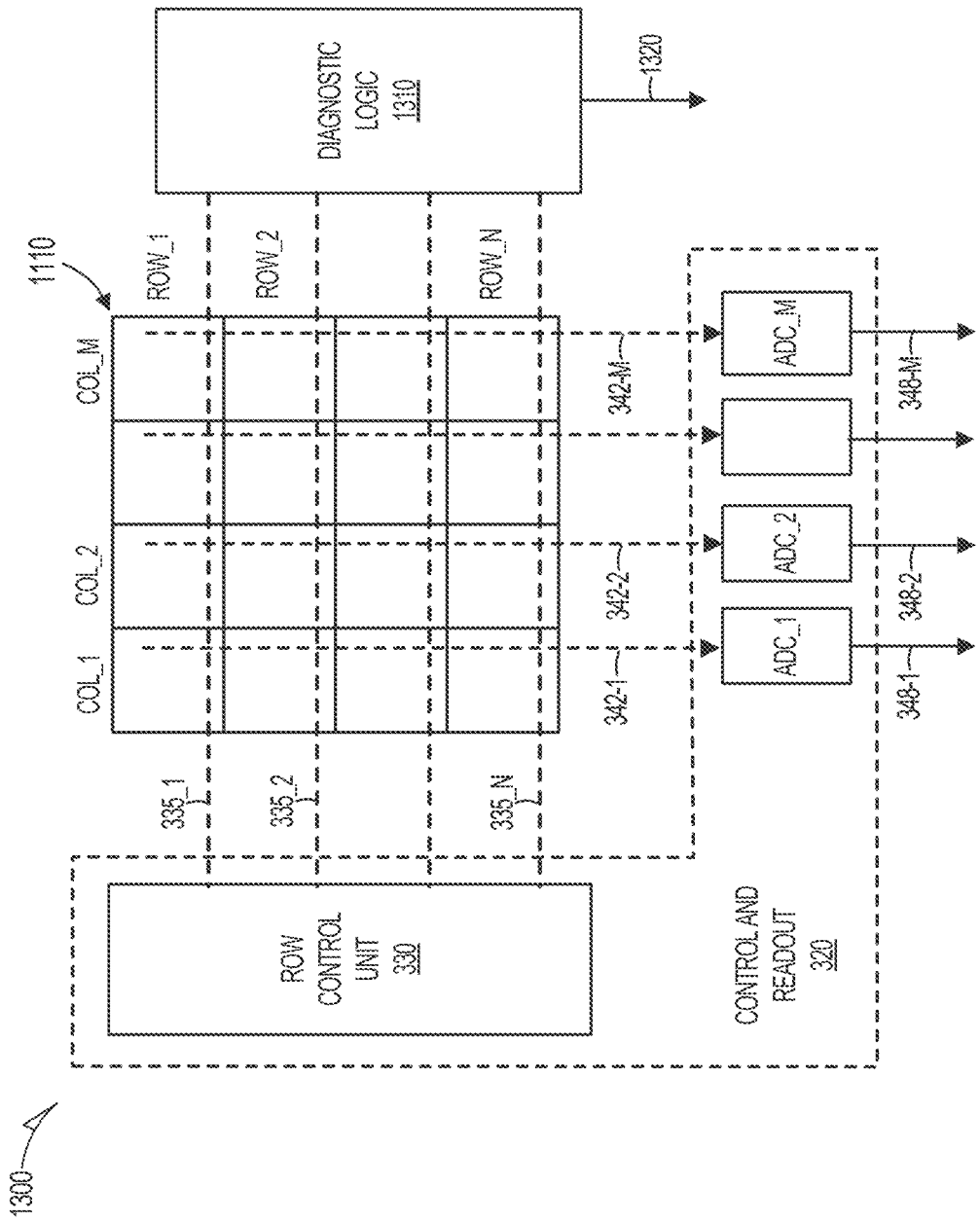
FIG. 13 shows an example schematic diagram of an imaging system in accordance with a further aspect of the present disclosure.

FIG. 13 shows a further example imaging system 1300 in accordance with an aspect of the present disclosure. In this example, the image sensor 1110 is of the same type as FIGS. 11 to 13 and does not include any diagnostic pixels. The system 1300 is similar to system 1100, but rather than having a row control unit replica 1130, the diagnostic circuitry is instead a diagnostic logic circuit 1310. The diagnostic logic circuit 1310 is configured to process the signals on the row control lines 335_n in such a way that faults with the row control unit 330 and/or the row control lines 335_n are detectable from output signal 1320, for example row control faults or row read order faults. The diagnostic logic circuit 1310 may be configured in a number of different ways depending on the nature of the faults that are to be detected and the arrangement of the image sensor 1110 (for example, its size) and operation of the row control unit 330.

Figure 14:
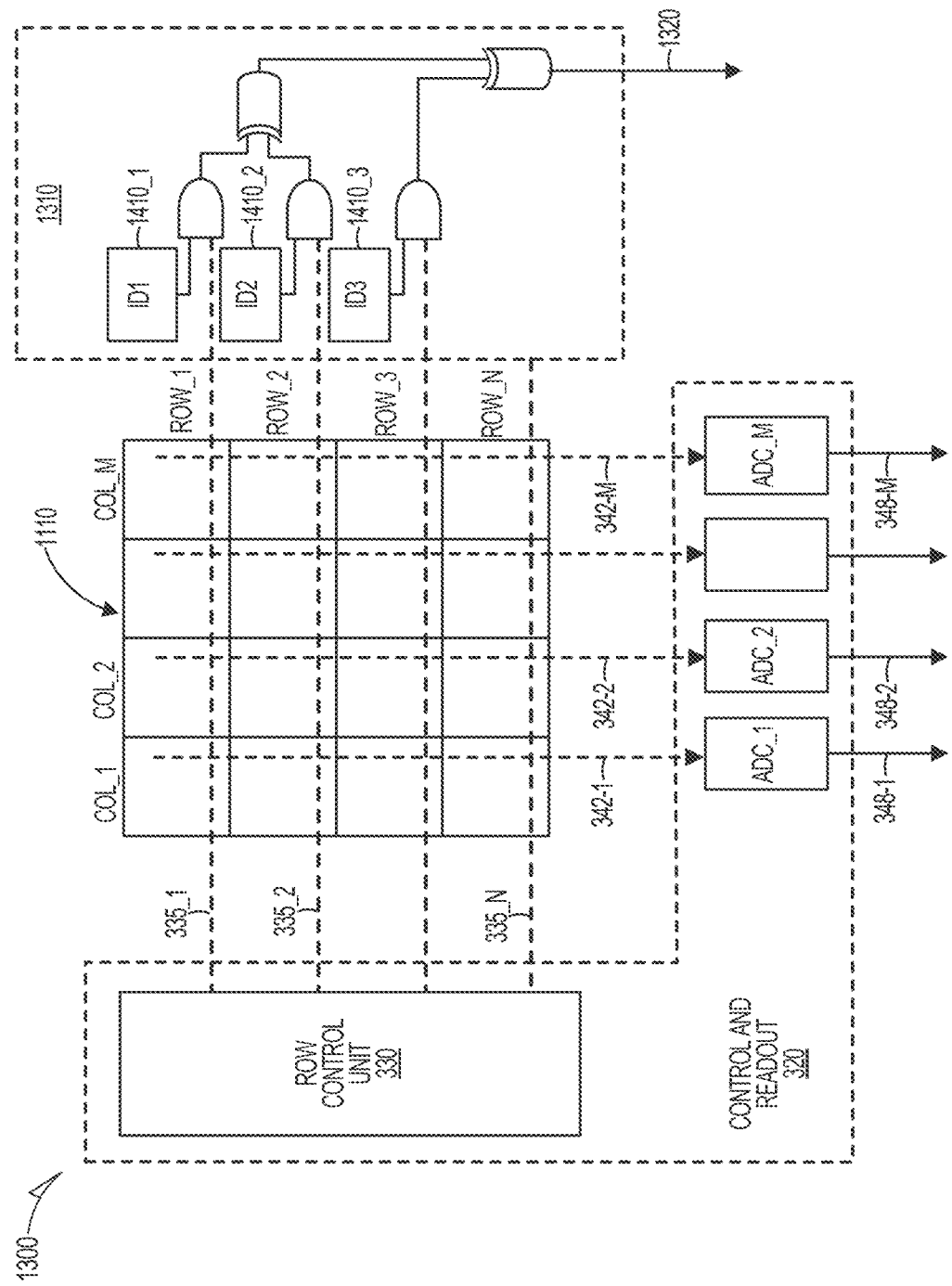
FIG. 14 shows further details of an example implementation of the system of FIG. 11.

FIG. 14 shows one example implementation of the diagnostic logic circuit 1310. For the sake of simplicity, the functionality of the diagnostic logic unit 1310 is represented for only three rows—Rows 1 to 3—but it will be readily appreciated that the same functionality may be scaled up for all N rows. The diagnostic logic circuit 1310 comprises three ID units—ID1 1410_1, ID2 1410_2 and ID3 1410_3—for the three rows. ID1 1410_1 is configured to output a value uniquely indicative of row 1, for example the binary value "01". ID2 1410_2 is configured to output a value uniquely indicative of row 2, for example the binary value "10". ID3 1410_3 is configured to output a value uniquely indicative of row 3, for example the binary value "11". It will be appreciated that longer binary words may be output if there are more than three rows, so that each row may be uniquely identified by a binary word. ID1 14101, ID2 1410_2 and ID3 1410_3 may be implemented in any suitable way, for example using memory or fixed logic. The diagnostic logic unit also comprises AND gates, each AND gate being coupled to a respective ID unit and row control line 335_n. As a result, when a row control line goes high, the output from the corresponding AND gate should go to the value output by the corresponding ID unit.

In more detail, the output of each AND gate may be expressed as:

$$\text{row\_identifier\_gated}[n] = \text{row\_identifier}[n] \ \& \ \text{row\_select}[n]$$

where:
row_identifier_gated[n] is the output of AND gate n
row_identifier[n] is the binary value output by the ID unit n
row_select[n] is the signal on row control line 335_n.

Therefore, when row_select[n] is 0, row_identifier_gated [n] is also 0.

When row_select[n] is 1, row_identifier_gatted[n] is set to row_identifier[n].

The outputs of the AND gates are XORd by the combination of OR gates in FIG. 14. Consequently, the value of Signal 1320 may be expressed as:

$$\text{Signal } 1320 = \text{row\_identifier\_gated}[1] \wedge \text{row\_identifier\_gated}[2] \wedge \text{row\_identifier\_gated}[3]$$

If the imaging system 1300 is operating correctly and just one pixel row is selected at a time, then one of the row_identifier_gated signals should be set to the row_identifier value of the selected row and all other row_identifier_gated signals should be 0. Since a 0 does nothing to an XOR gate, then the selected row's identifier should be passed through to signal 1320 unchanged. Therefore, signal 1320 should by indicative of the currently selected pixel row, such that selection of the correct pixel rows may be verified by signal 1320. Consequently, a fault in selecting pixel rows in the wrong order may be identified using signal 1320. Also, a fault in a row control line 335 (for example, a break) may also be identified by virtue signal 1320 never being set to the row identifier value for that row.

Furthermore, signal 1320 may be useful in identifying faults where two rows are selected simultaneously, since this should corrupt the value to which the signal 1320 is set such that it is different to the value that is expected.

For example, if row[2] should be selected, but erroneously both row[1] and row[2] are selected simultaneously, then:

$$\text{row\_identifier\_gated}[1] = 2'b01 \ \& \ 2'b11 = 2'b01$$
$$\text{row\_identifier\_gated}[2] = 2'b10 \ \& \ 2'b11 = 2'b10$$
$$\text{row\_identifier\_gated}[3] = 2'b11 \ \& \ 2'b00 = 2'b00$$
$$\text{Signal } 1320 = 2'b01 \wedge 2'b10 \wedge 2'b00 = 2'b11$$

Therefore, signal 1320 suggests that row[3] is selected (since 2'b11 is the row identifier value for row[3]). Since this is different to the row that should be selected, it is clear that the imaging system 1300 is operating erroneously.

Whilst FIG. 14 shows one particular logic implementation, it will be appreciated that various different logic arrangements may be used such that the output signal 1320 is generated based on the control signals on the row control lines 335_*n* in such a way that the output signal 1320 can be used for operation diagnostics (for example, determining which row is selected at any given time, and if there are any row selection faults).

The skilled person will readily appreciate that various alterations or modifications may be made to the above described aspects of the disclosure without departing from the scope of the disclosure.

In each of the examples described above, the reference signals used for the diagnostic pixels are derived from a primary voltage reference, Vref, using a potential divider network. In one example alternative, they may each be generated by a digital to analog converter (DAC). This alternative may allow for crude parametric testing of all of the ADCs in the system, for example testing their linearity, gain, full scale range, etc, by sweeping the DAC through a range of voltages (for example the full DAC conversion range), with reference signals being readout at each level through which the DAC is swept. From the reference signals readout at each level, the linearity, gain and/or full scale range of the ADCs may be determined. Operations such as these may be performed, for example, at system startup and/or intermittently or periodically during system operation (for example, simply by using the DAC to change the reference voltage levels for each new frame capture). Furthermore, it may be possible between frames to change the voltage references so that the unique row IDs and/or column IDs change. This would help in the detection of stuck frames whereby consecutive frames appear to be identical, but only because the image signal levels have become stuck. If the reference levels for the diagnostic pixels have changed between frames and the reference signals output from the ADCs remain the same, it indicates that there is a fault with at least a part of the imager system that is causing stuck frames.

Whilst in the above, the reference signal applied to each diagnostic pixel, and the diagnostic signal readout from each diagnostic pixel, is typically described as a voltage signal, in other image sensor implementations they may be signals of any other suitable type. For example, the diagnostic pixels could each comprise a capacitor and the reference signal may be a current signal that is used to charge the capacitor to a reference charge level. The diagnostic signal may then be readout as a voltage signal that is dependent on the reference charge level, and therefore dependent on the reference current signal.

Aspects of the Disclosure

Non-limiting aspects of the disclosure are set out in the following numbered clauses.

Clause 1. An imaging system comprising;
  an image sensor comprising:
    a plurality of imaging pixels arranged in a matrix of rows and columns, wherein each imaging pixel is configured to accumulate charge in dependence on light incident on the imaging pixel; and
    at least one diagnostic pixel coupled to a reference signal;
  and
  control and readout circuitry configured to:
    select one or more of the imaging pixels and, for each selected imaging pixel, readout an imaging signal that is indicative of the charge accumulated on the selected imaging pixel;
    select the at least one diagnostic pixel and readout a diagnostic signal that is indicative of the reference signal; and
    output the diagnostic signal for use in system diagnostics.

Clause 2. The imaging system of clause 1, comprising a first plurality of diagnostic pixels each coupled to a respective reference signal,
  wherein the first plurality of diagnostic pixels are arranged as one or more columns of diagnostic pixels, and
  wherein the control and readout circuitry is configured to:
    select and readout the imaging pixels of a particular row of the image sensor; and
    select and readout the one or more diagnostic pixels that are on the particular row of the image sensor.

Clause 3. The imaging system of clause 2, wherein the first plurality of diagnostic pixels are arranged as a single column of diagnostic pixels.

Clause 4. The imaging system of clause 3, wherein the reference signal for each of the first plurality of diagnostic pixels is different.

Clause 5. The imaging system of clause 2, wherein the first plurality of diagnostic pixels are arranged as a plurality of columns of diagnostic pixels.

Clause 6. The imaging system of clause 5, wherein the combination of reference signals used for each row of the first plurality of diagnostic pixels is different.

Clause 7. The imaging system of any of clauses 2 to 6, wherein the control and readout circuitry comprises row control circuitry configured to output control signals to control the selection and readout of the imaging pixels and the at least one diagnostic pixel of the particular row, and
  wherein the row control unit is positioned to one side of the image sensor, adjacent to one of the end columns of imaging pixels, and
  wherein the one or more columns of diagnostic pixels are positioned on the opposite side of the image sensor to that of the row control unit.

Clause 8. The imaging system of any of clauses 2 to 7, wherein the control and readout circuitry is configured to select and readout in parallel the imaging pixels and the one or more diagnostic pixels of the particular row.

Clause 9. The imaging system of any preceding claim, comprising a second plurality of diagnostic pixels each coupled to a respective reference signal,
wherein the second plurality of diagnostic pixels are arranged as one or more rows of diagnostic pixels, and
wherein the control and readout circuitry is configured to:
select a row of imaging pixels and readout their imaging signals via a plurality of readout lines; and
select a row of the one or more rows of diagnostic pixels and readout their diagnostic signals via the plurality of readout lines.

Clause 10. The imaging system of clause 9, wherein the second plurality of diagnostic pixels are arranged as a single row of diagnostic pixels.

Clause 11. The imaging system of clause 10, wherein the reference signal for each of the second plurality of diagnostic pixels is different.

Clause 12. The imaging system of clause 9, wherein the second plurality of diagnostic pixels are arranged as a plurality of rows diagnostic pixels.

Clause 13. The imaging system of clause 12, wherein the combination of reference signals used for each column of the second plurality of diagnostic pixels is different.

Clause 14. The imaging system of any of clauses 9 to 13, wherein the one or more rows of diagnostic pixels are positioned on the opposite side of the image sensor to the side at which the plurality of readout lines output the imaging signals and diagnostic signals.

Clause 15. The imaging system of any preceding clause, further comprising:
a diagnostics unit configured to detect a fault in the image sensor and/or the control and readout circuitry based on a comparison of the diagnostic signal and the reference signal.

Clause 16. An imaging system comprising;
an image sensor comprising:
a plurality of imaging pixels arranged in a matrix of rows and columns, wherein each imaging pixel is configured to accumulate charge in dependence on light incident on the imaging pixel; and
for each row of imaging pixels, a row control line for selecting the row of imaging pixels for readout;
row control circuitry coupled to each row control line and configured to output control signals to each row control line to control the selection and readout of the imaging pixels; and
a diagnostic circuit coupled to each row control line and configured to output a signal that is generated based on the control signals on the row control lines during selection and readout of the imaging pixels.

Clause 17. The imaging system of clause 16, wherein the diagnostic circuit is a row control circuit replica configured to replicate the operation of the row control circuit.

Clause 18. The imaging system of clause 16, wherein the diagnostic circuit comprises logic configured such that during selection and readout of the imaging pixels, the signal output by the diagnostic circuit identifies the selected row of pixels.

Clause 19. The imaging system of any of clauses 16 to 18, wherein the row control circuit is coupled to one end of each row control line and the diagnostic circuit is coupled to the other end of each row control line.

Clause 20. An imaging system comprising;
an image sensor comprising:
a plurality of imaging pixels arranged in a matrix of rows and columns, wherein each imaging pixel is configured to accumulate charge in dependence on light incident on the imaging pixel; and
a first plurality of diagnostic imaging pixels, wherein some of the diagnostic imaging pixels are shaded so that they do not accumulate charge in dependence on light incident on the diagnostic imaging pixel, and others of the diagnostic imaging pixels are unshaded so that they do accumulate charge in dependence on light incident on the diagnostic imaging pixel; and
control and readout circuitry configured to:
select one or more of the imaging pixels and, for each selected imaging pixel, readout an imaging signal that is indicative of the charge accumulated on the selected imaging pixel;
select at least one of the plurality of diagnostic imaging pixels and, for each selected diagnostic pixel, readout a diagnostic signal that is indicative of the charge accumulated on the selected diagnostic pixel; and
output the diagnostic signal for use in system diagnostics.

Clause 21. The imaging system of clause 20, wherein the first plurality of diagnostic imaging pixels are arranged as a single column of diagnostic imaging pixels and the shaded and unshaded diagnostic imaging pixels alternate along the single column.

Clause 22. The imaging system of clause 20, wherein the first plurality of diagnostic imaging pixels are arranged as a plurality of columns of diagnostic imaging pixels.

Clause 23. The imaging system of clause 22, wherein the combination of shaded and unshaded diagnostic imaging pixels used for each row of the first plurality of diagnostic imaging pixels is different.

Clause 24. The imaging system of any of clauses 21 to 23, further comprising:
a second plurality of diagnostic imaging pixels, wherein some of the diagnostic imaging pixels are shaded so that they do not accumulate charge in dependence on light incident on the diagnostic imaging pixel, and others of the diagnostic imaging pixels are unshaded so that they do accumulate charge in dependence on light incident on the diagnostic imaging pixel,
wherein the second plurality of diagnostic imaging pixels are arranged as one or more rows of diagnostic imaging pixels.

Clause 25. The imaging system of clause 20, wherein the first plurality of diagnostic imaging pixels are arranged as one or more rows of diagnostic imaging pixels.

The invention claimed is:

1. An imaging system comprising;
an image sensor comprising:
a plurality of imaging pixels arranged in a matrix of rows and columns, wherein each imaging pixel is configured to accumulate charge in dependence on light incident on the imaging pixel; and
at least one diagnostic pixel coupled to a reference signal; and
control and readout circuitry configured to:
select one or more of the imaging pixels and, for each selected imaging pixel, readout an imaging signal that is indicative of the charge accumulated on the selected imaging pixel;
select the at least one diagnostic pixel and, for each selected diagnostic pixel, readout a diagnostic signal that is indicative of the reference signal of the selected diagnostic pixel; and
output the diagnostic signal for use in system diagnostics.

2. The imaging system of claim 1, comprising a first plurality of diagnostic pixels each coupled to a respective reference signal,
wherein the first plurality of diagnostic pixels are arranged as one or more columns of diagnostic pixels, and
wherein the control and readout circuitry is configured to:
select and readout the imaging pixels of a particular row of the image sensor; and
select and readout the one or more diagnostic pixels that are on the particular row of the image sensor.

3. The imaging system of claim 2, wherein the first plurality of diagnostic pixels are arranged as a single column of diagnostic pixels.

4. The imaging system of claim 3, wherein the reference signal for each of the first plurality of diagnostic pixels is different.

5. The imaging system of claim 2, wherein the first plurality of diagnostic pixels are arranged as a plurality of columns of diagnostic pixels.

6. The imaging system of claim 5, wherein a combination of reference signals used for each row of the first plurality of diagnostic pixels is different.

7. The imaging system of claim 2, wherein the control and readout circuitry comprises row control circuitry configured to output control signals to control the selection and readout of the imaging pixels and the at least one diagnostic pixel of the particular row, and
wherein the row control circuitry is positioned to one side of the image sensor, adjacent to an end column of imaging pixels, and
wherein the one or more columns of diagnostic pixels are positioned on an opposite side of the image sensor to that of the row control unit.

8. The imaging system of claim 2, wherein the control and readout circuitry is configured to select and readout in parallel the imaging pixels and the one or more diagnostic pixels of the particular row.

9. The imaging system of claim 1, comprising a second plurality of diagnostic pixels each coupled to a respective reference signal,
wherein the second plurality of diagnostic pixels are arranged as one or more rows of diagnostic pixels, and
wherein the control and readout circuitry is configured to:
select a row of imaging pixels and readout their imaging signals via a plurality of readout lines; and
select a row of the one or more rows of diagnostic pixels and readout their diagnostic signals via the plurality of readout lines.

10. The imaging system of claim 9, wherein the second plurality of diagnostic pixels are arranged as a single row of diagnostic pixels.

11. The imaging system of claim 10, wherein the reference signal for each of the second plurality of diagnostic pixels is different.

12. The imaging system of claim 9, wherein the second plurality of diagnostic pixels are arranged as a plurality of rows diagnostic pixels.

13. The imaging system of claim 12, wherein a combination of reference signals used for each column of the second plurality of diagnostic pixels is different.

14. The imaging system of claim 9, wherein the one or more rows of diagnostic pixels are positioned on an opposite side of the image sensor to the side at which the plurality of readout lines output the imaging signals and diagnostic signals.

15. The imaging system of claim 1, further comprising:
a diagnostics unit configured to detect a fault in the image sensor and/or the control and readout circuitry based on a comparison of the diagnostic signal and the reference signal for each selected diagnostic pixel.

16. An imaging system comprising;
an image sensor comprising:
a plurality of imaging pixels arranged in a matrix of rows and columns, wherein each imaging pixel is configured to accumulate charge in dependence on light incident on the imaging pixel; and
for each row of imaging pixels, a row control line for selecting the row of imaging pixels for readout;
row control circuitry coupled to each row control line and configured to output control signals to each row control line to control the selection and readout of the imaging pixels; and
a diagnostic circuit coupled to each row control line and configured to output a signal that is generated based on the control signals on the row control lines during selection and readout of the imaging pixels.

17. The imaging system of claim 16, wherein the diagnostic circuit is a row control circuit replica configured to replicate an operation of the row control circuit.

18. The imaging system of claim 16, wherein the diagnostic circuit comprises logic configured such that during selection and readout of the imaging pixels, the signal output by the diagnostic circuit identifies the selected row of pixels.

19. The imaging system of claim 16, wherein the row control circuit is coupled to one end of each row control line and the diagnostic circuit is coupled to an other end of each row control line.

20. An imaging system comprising;
an image sensor comprising:
a plurality of imaging pixels arranged in a matrix of rows and columns, wherein each imaging pixel is configured to accumulate charge in dependence on light incident on the imaging pixel; and
a first plurality of diagnostic imaging pixels, wherein some of the diagnostic imaging pixels are shaded so that they do not accumulate charge in dependence on light incident on the diagnostic imaging pixel, and others of the diagnostic imaging pixels are unshaded so that they do accumulate charge in dependence on light incident on the diagnostic imaging pixel; and
control and readout circuitry configured to:
select one or more of the imaging pixels and, for each selected imaging pixel, readout an imaging signal that is indicative of the charge accumulated on the selected imaging pixel;
select at least one of the plurality of diagnostic imaging pixels and, for each selected diagnostic pixel, readout a diagnostic signal that is indicative of the charge accumulated on the selected diagnostic pixel; and
output the diagnostic signal for use in system diagnostics.

* * * * *